US012776289B2

(12) United States Patent
Harada et al.

(10) Patent No.: US 12,776,289 B2
(45) Date of Patent: Oct. 27, 2026

(54) DISPLAY DEVICE INCLUDING PAIR OF PIXELS

(71) Applicant: Magnolia White Corporation, Tokyo (JP)

(72) Inventors: Tsutomu Harada, Tokyo (JP); Kazunari Tomizawa, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 100 days.

(21) Appl. No.: 18/227,690

(22) Filed: Jul. 28, 2023

(65) Prior Publication Data

US 2024/0046898 A1 Feb. 8, 2024

(30) Foreign Application Priority Data

Jul. 28, 2022 (JP) ................................ 2022-120768

(51) Int. Cl.
*G09G 3/36* (2006.01)

(52) U.S. Cl.
CPC ... *G09G 3/3607* (2013.01); *G09G 2300/0452* (2013.01); *G09G 2320/0271* (2013.01); *G09G 2340/0457* (2013.01)

(58) Field of Classification Search
CPC ............... G09G 3/2003; G09G 3/3607; G09G 3/30–3291; G09G 2300/0439; G09G 2300/0443; G09G 2300/0452; G09G 2300/0465; G09G 2320/0242; G09G 2320/0271; G09G 2320/0673;

(Continued)

(56) References Cited

U.S. PATENT DOCUMENTS 5,144,288 A 9/1992 Hamada et al.
6,661,429 B1 * 12/2003 Phan .................. G09G 3/3607 345/694

(Continued)

FOREIGN PATENT DOCUMENTS

JP S60-218626 A 11/1985
JP 2008-277264 A 11/2008

(Continued)

OTHER PUBLICATIONS

Office Action issued in corresponding Japanese Patent Application No. 2022-120768, mailed Nov. 25, 2025 and English translation of same. 8 pages.

(Continued)

*Primary Examiner* — Roberto W Flores
(74) *Attorney, Agent, or Firm* — K&L Gates LLP

(57) ABSTRACT

Each pair of pixels including two pixels adjacent to each other includes two first sub pixels, two second sub pixels, and two third sub pixels. One of the two first sub pixels and one of the two second sub pixels are included in one of the pair of pixels. The other of the two second sub pixels and one of the two third sub pixels are included in the other of the pair of pixels. The other of the two third sub pixels and the other of the two first sub pixels are disposed across and included in both of the pair of pixels. The drive circuit allocates the gradation data of one pixel to the gradation data of another pixel adjacent to the one pixel and drives the first, second, and third sub pixels included in the other pixel based on the gradation data of the other pixel.

16 Claims, 15 Drawing Sheets

(58) Field of Classification Search
CPC ....... G09G 2340/06; G09G 2340/0457; G09G 2320/0686
See application file for complete search history.

(56) References Cited

U.S. PATENT DOCUMENTS

| | | | | |
|---|---|---|---|---|
| 2008/0290794 | A1 | 11/2008 | Yuasa | |
| 2013/0106891 | A1 | 5/2013 | Matsueda et al. | |
| 2015/0364075 | A1* | 12/2015 | Sato | G09G 3/3233 345/698 |
| 2016/0035265 | A1 | 2/2016 | Park et al. | |
| 2017/0018238 | A1* | 1/2017 | Kang | G09G 3/2074 |
| 2017/0309214 | A1 | 10/2017 | Park et al. | |
| 2018/0061368 | A1 | 3/2018 | Sako et al. | |
| 2019/0156727 | A1 | 5/2019 | Minaki et al. | |
| 2019/0341002 | A1 | 11/2019 | Kimura et al. | |
| 2019/0355792 | A1* | 11/2019 | Yu | G09G 5/02 |
| 2021/0373369 | A1 | 12/2021 | Tomizawa et al. | |
| 2023/0100358 | A1* | 3/2023 | Minaki | G09G 3/3291 345/694 |
| 2024/0321155 | A1* | 9/2024 | Suyama | G09G 3/20 |

FOREIGN PATENT DOCUMENTS

| | | | |
|---|---|---|---|
| JP | 2013097371 | A | 5/2013 |
| JP | 2018-031920 | A | 3/2018 |
| JP | 2018101140 | A | 6/2018 |
| JP | 2019-082509 | A | 5/2019 |
| JP | 2019095513 | A | 6/2019 |
| JP | 2019-194632 | A | 11/2019 |
| JP | 2021-189336 | A | 12/2021 |

OTHER PUBLICATIONS

Office Action issued in corresponding Japanese Patent Application No. 2022-120768, mailed Apr. 21, 2026 and English translation of same. 6 pages.

* cited by examiner

DISPLAY DEVICE INCLUDING PAIR OF PIXELS

CROSS-REFERENCE TO RELATED APPLICATION

This application claims the benefit of priority from Japanese Patent Application No. 2022-120768 filed on Jul. 28, 2022, the entire contents of which are incorporated herein by reference.

BACKGROUND

1. Technical Field

What is disclosed herein relates to a display device.

2. Description of the Related Art

Japanese Patent Application Laid-open Publication No. 2013-097371, Japanese Patent Application Laid-open Publication No. 2018-101140, and Japanese Patent Application Laid-open Publication No. 2019-095513 disclose a display device including a plurality of sub pixels in a display region and capable of improving display quality by displaying an image in the display region through rendering processing of image signals.

The resolution of a display device has been becoming higher and the display quality thereof has been demanded to improve.

For the foregoing reasons, there is a need for a display device capable of improving the display quality.

SUMMARY

According to an aspect, a display device includes: a plurality of first sub pixels, a plurality of second sub pixels, and a plurality of third sub pixels included in a plurality of pixels in a display region; and a drive circuit configured to drive the first sub pixels, the second sub pixels, and the third sub pixels based on a plurality of pieces of gradation data of each of the plurality of pixels. Each pair of pixels including two pixels adjacent to each other among the plurality of pixels includes two of the first sub pixels, two of the second sub pixels, and two of the third sub pixels. One of the two of the first sub pixels and one of the two of the second sub pixels are included in one of the pair of pixels. The other of the two of the second sub pixels and one of the two of the third sub pixels are included in the other of the pair of pixels. The other of the two of the third sub pixels and the other of the two of the first sub pixels are disposed across and included in both of the pair of pixels. The drive circuit is configured to allocate the gradation data of one of the plurality of pixels to the gradation data of another pixel adjacent to the one pixel among the plurality of pixels and drive the first, second, and third sub pixels included in the other pixel based on the gradation data of the other pixel.

According to an aspect, a display device includes: a plurality of first sub pixels, a plurality of second sub pixels, and a plurality of third sub pixels included in a plurality of pixels in a display region; and a drive circuit configured to drive the first sub pixels, the second sub pixels, and the third sub pixels based on a plurality of pieces of gradation data of each of the plurality of pixels. Each pair of pixels including two pixels adjacent to each other among the plurality of pixels includes three of the first sub pixels, two of the second sub pixels, and one of the third sub pixels. A first one of the three first sub pixels and one of the two second sub pixels are included in one of the pair of pixels. A second one of the three first sub pixels and the other of the two second sub pixels are included in the other of the pair of pixels. A third one of the three first sub pixels and the one third sub pixel are disposed across and included in both of the pair of pixels. The drive circuit is configured to allocate the gradation data of one of the plurality of pixels to the gradation data of another pixel adjacent to the one pixel among the plurality of pixels and drive the first, second, and third sub pixels included in the other pixel based on the gradation data of the other pixel.

DETAILED DESCRIPTION

Figure 1:
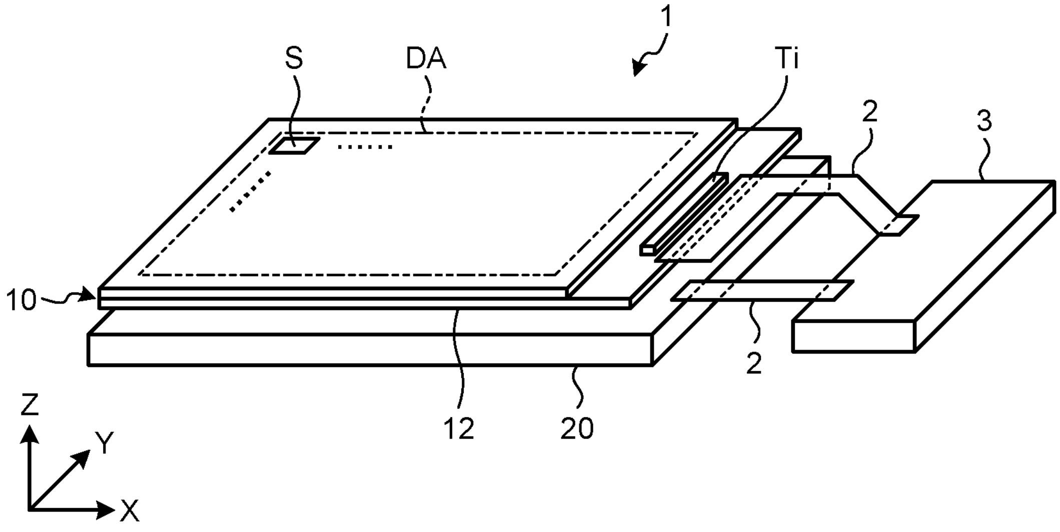
FIG. 1 is a diagram illustrating the configuration of a display device according to a first embodiment of the present disclosure.

Embodiments of the present disclosure will be described below with reference to the accompanying drawings. Contents described below in the embodiments do not limit the present disclosure. Components described below include those that could be easily thought of by the skilled person in the art and those identical in effect. The components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In this disclosure, when an element is described as being "on" another element, the element can be directly on the other element, or there can be one or more elements between the element and the other element.

An X direction and a Y direction illustrated in the drawings correspond to directions parallel to the principal surface of a substrate included in a display device. The positive and negative X sides in the X direction and the positive and negative Y sides in the Y direction correspond to sides of a display device 1. A Z direction corresponds to a thickness direction of the display device 1, the positive Z side in the Z direction corresponds to a front surface side on which an image is displayed in the display device 1, and the negative Z side in the Z direction corresponds to a back surface side of the display device 1. In the present specification, a "plan view" is a view of the display device 1 from the positive Z side toward the negative Z side. The X, Y, and Z directions are exemplary, and the present disclosure is not limited to these directions. The X direction corresponds to a "first direction". The Y direction corresponds to a "second direction".

First Embodiment

FIG. 1 is a diagram illustrating the configuration of the display device 1 according to a first embodiment of the present disclosure. The display device 1 displays an image based on image signals output from an external device 3 electrically coupled through a flexible wiring substrate 2. The display device 1 includes a display panel 10 and an illumination apparatus 20.

The display panel 10 is a transmissive liquid crystal display. The display panel 10 may be, for example, an organic EL display or an inorganic EL display. The front surface of the display panel 10 has a display region DA in which an image is displayed. The display panel 10 includes a plurality of sub pixels S disposed in a matrix of a row-column configuration in the X and Y directions in the display region DA. The sub pixels S will be described later in detail.

The illumination apparatus 20 is disposed on the back surface side of the display panel 10 and emits light toward the display panel 10. The illumination apparatus 20 is composed of, for example, a plurality of light-emitting diodes.

Figure 2:
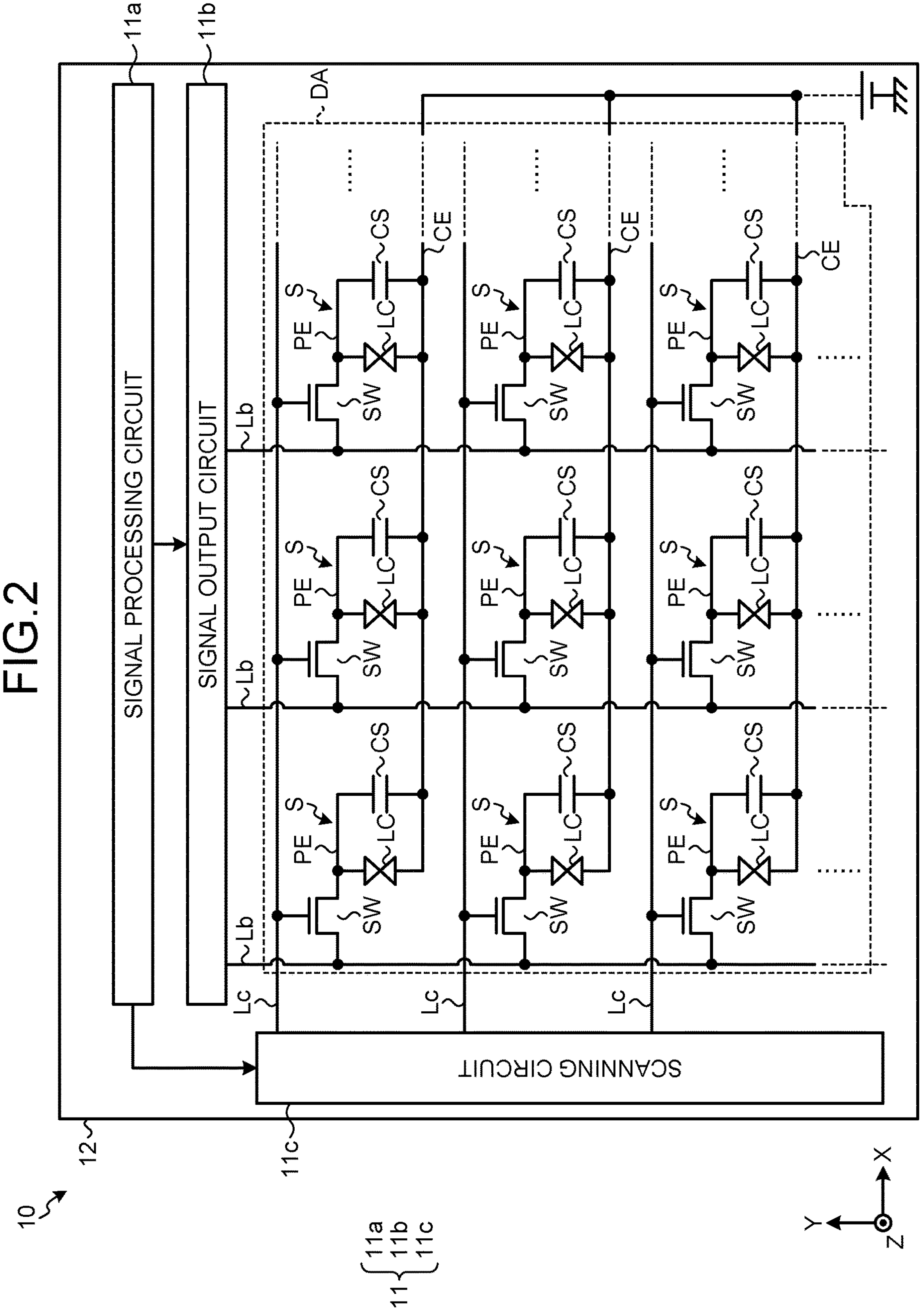
FIG. 2 is a diagram illustrating a circuit configuration of a display panel.

FIG. 2 is a diagram illustrating a circuit configuration of the display panel 10. The display panel 10 includes a drive circuit 11 and also includes a switching element SW, a sub pixel electrode PE, a common electrode CE, a liquid crystal capacitor LC, and a holding capacitor CS that are included in each of the plurality of sub pixels S.

The drive circuit 11 drives the plurality of sub pixels S. The drive circuit 11 includes a signal processing circuit 11*a*, a signal output circuit 11*b*, and a scanning circuit 11*c*.

The signal processing circuit 11*a* generates a plurality of sub pixel signals based on image signals transmitted from the external device 3 (to be described later in detail) and outputs the plurality of generated sub pixel signals to the signal output circuit 11*b*. The signal processing circuit 11*a* also outputs, to the signal output circuit 11*b* and the scanning circuit 11*c*, a clock signal that synchronizes operation of the signal output circuit 11*b* and operation of the scanning circuit 11*c*.

The signal output circuit 11*b* outputs the plurality of sub pixel signals to their corresponding sub pixels S. The signal output circuit 11*b* is electrically coupled to the plurality of sub pixels S through a plurality of signal lines Lb extending in the Y direction.

The scanning circuit 11*c* scans the plurality of sub pixels S in synchronization with the outputting of sub pixel signals by the signal output circuit 11*b*. The scanning circuit 11*c* is electrically coupled to the plurality of sub pixels S through a plurality of scanning lines Lc extending in the X direction.

Each switching element SW is formed of, for example, a thin film transistor (TFT). Each switching element SW has a source electrode electrically coupled to the corresponding signal line Lb, and a gate electrode electrically coupled to the corresponding scanning line Lc.

Each sub pixel electrode PE is coupled to the drain electrode of the corresponding switching element SW. The plurality of common electrodes CE are disposed corresponding to the plurality of scanning lines Lc. The sub pixel electrodes PE and the common electrodes CE have the property of transmitting light.

Each liquid crystal capacitor LC is a capacitive component of the liquid crystal material of a liquid crystal layer 13, to be described later, between the corresponding sub pixel electrode PE and the corresponding common electrode CE. Each holding capacitor CS is disposed between an electrode equipotential to the corresponding common electrode CE and an electrode equipotential to the corresponding sub pixel electrode PE.

Figure 3A:
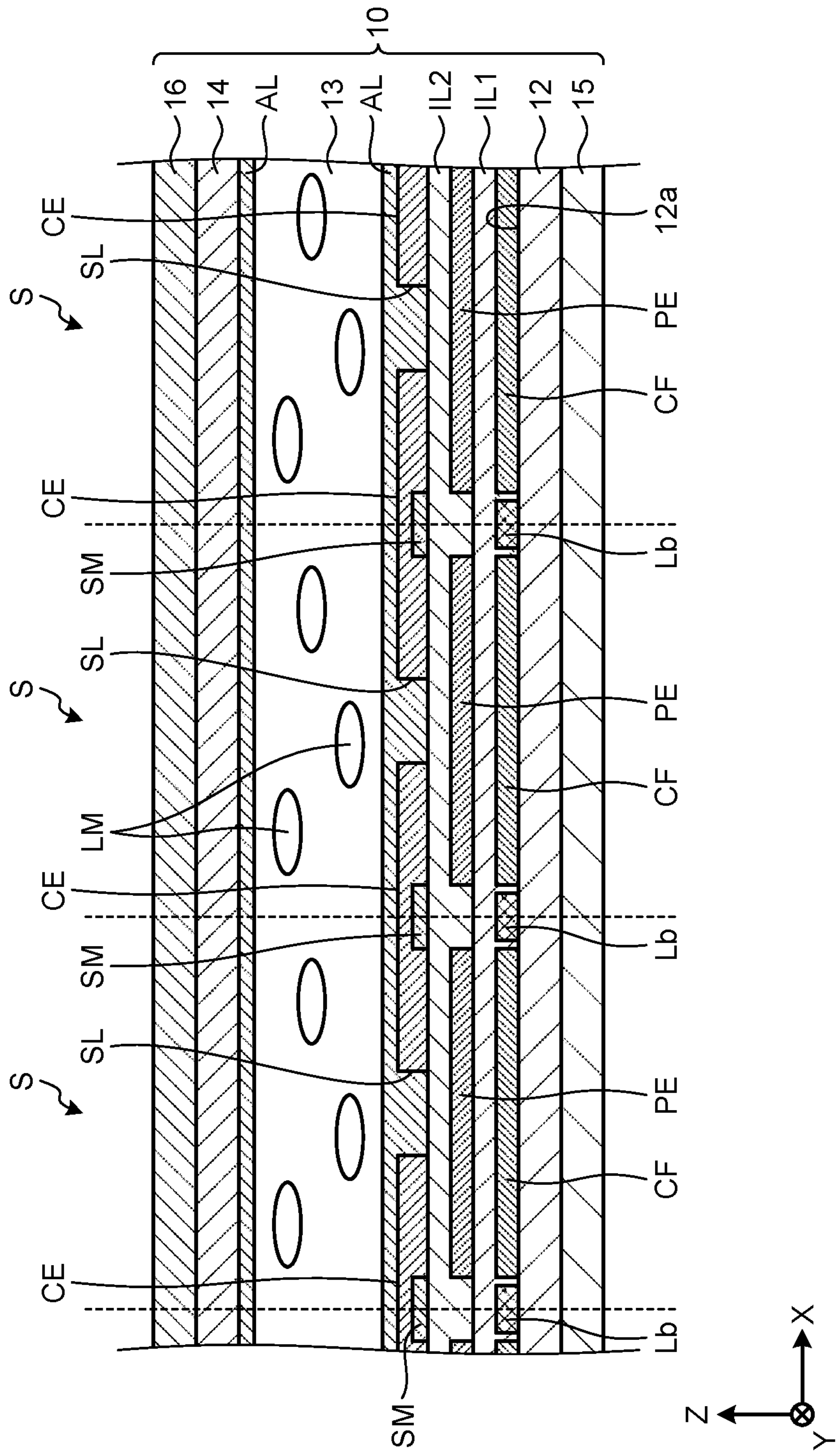
FIG. 3A is a cross-sectional view of the display panel.

FIG. 3A is a cross-sectional view of the display panel Each sub pixel S further includes a first substrate 12, the liquid crystal layer 13, and a second substrate 14. The first substrate 12, the liquid crystal layer 13, and the second substrate 14 have the property of transmitting light and are disposed in the order as listed from the negative Z side toward the positive Z side in the Z direction.

The first substrate 12 is rectangular in a plan view and provided one for the plurality of sub pixels S. An IC chip Ti included in the drive circuit 11 is disposed on the first substrate 12 (FIG. 1).

Color filters CF and the signal lines Lb are disposed on a principal surface 12*a* of the first substrate 12 on the positive Z side. Each color filter CF is rectangular in a plan view and disposed one for a corresponding one of the plurality of sub pixels S.

Each color filter CF has the property of transmitting light, and a spectrum peak of light to be transmitted is determined in advance. The spectrum peak is any of three spectrum peaks corresponding to three colors different from one another. The three colors are red, green, and blue, but the number and kinds of colors are not limited thereto. Hereinafter, a color corresponding to the spectrum peak of light transmitted by each color filter CF is referred to as the color of the color filters CF.

Each signal line Lb is disposed between the color filters CF of two sub pixels S adjacent to each other in the X direction. The signal line Lb overlaps the boundary of the two sub pixels S adjacent to each other in the X direction. Each scanning line Lc is disposed between the color filters CF of two sub pixels S adjacent to each other in the Y direction on the principal surface 12*a*.

In addition, the sub pixel electrodes PE are disposed on the positive Z side of the color filters CF and the signal lines Lb on the first substrate 12 with an insulating layer IL1 interposed therebetween. The sub pixel electrodes PE overlap the color filters CF in the Z direction.

Furthermore, light-shielding films SM and the common electrodes CE are disposed on the positive Z side of the sub pixel electrodes PE on the first substrate 12 with an insulating layer IL2 interposed therebetween.

The light-shielding films SM have the property of blocking light and partition the plurality of sub pixels S. Specifically, the light-shielding films SM each overlap the boundary of a plurality of sub pixels S adjacent to each other in the X and Y directions. The light-shielding films SM overlap the signal lines Lb and the scanning lines Lc in the Z direction.

Each common electrode CE is stacked on the positive Z side of the corresponding light-shielding film SM, has a slit SL, and is disposed across two sub pixel electrodes PE adjacent to each other. In this manner, the common electrodes CE and the sub pixel electrodes PE are disposed on the first substrate 12. In other words, the display panel 10 is a horizontal field liquid crystal display.

The liquid crystal layer 13 includes a plurality of liquid crystal molecules LM. The liquid crystal layer 13 is disposed between two alignment films AL in the Z direction. The orientation of the liquid crystal molecules LM is regulated by the two alignment films AL.

The second substrate 14 is rectangular in a plan view and provided one for the plurality of sub pixels S.

The display panel 10 further includes a first polarization plate 15 disposed on the back surface side of the first substrate 12, and a second polarization plate 16 disposed on the front surface side of the second substrate 14.

The first polarization plate 15 has a transmission axis orthogonal to the Z direction. The second polarization plate 16 has a transmission axis orthogonal to the transmission axis of the first polarization plate 15 and the Z direction.

Figure 3B:
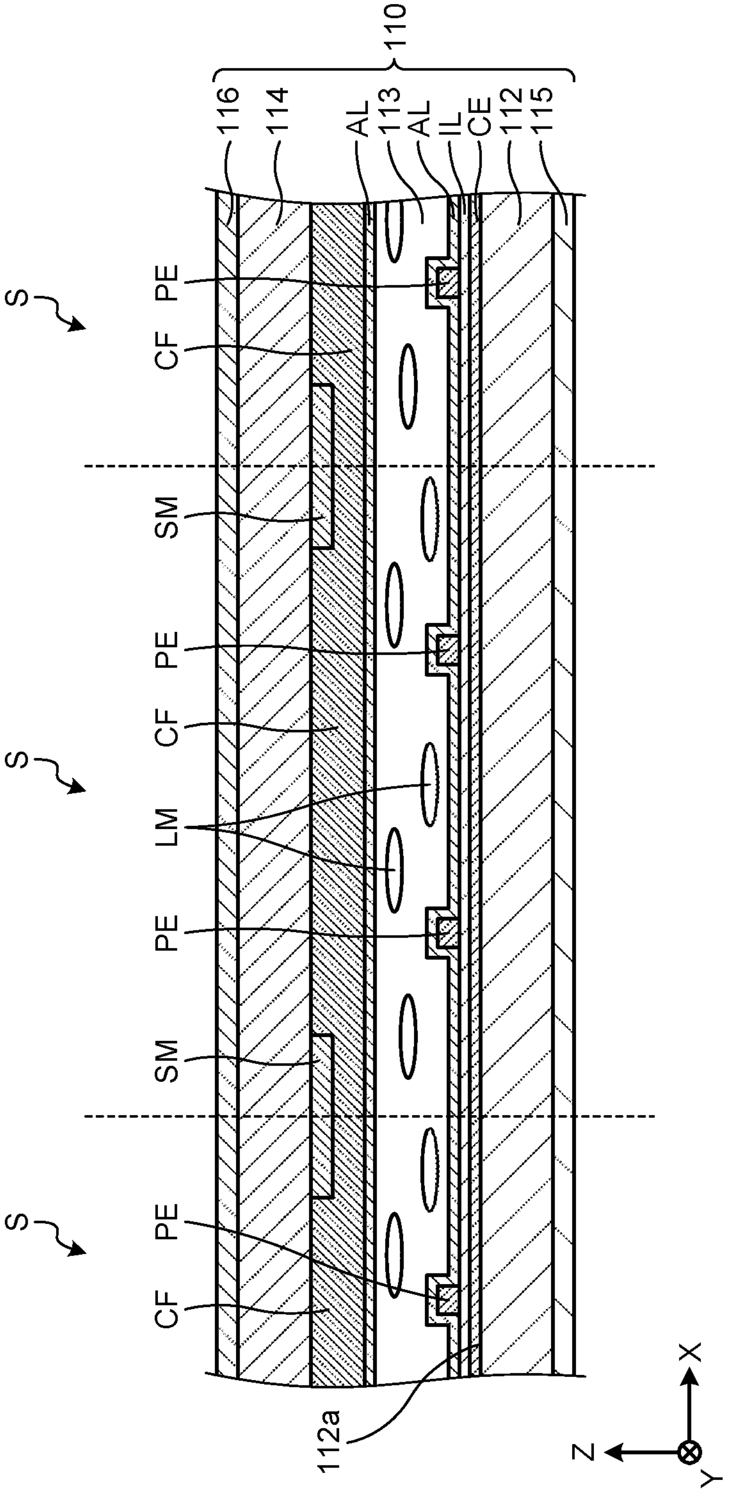
FIG. 3B is a cross-sectional view of the display panel according to a modification of the first embodiment.

The display panel 10 may be configured as illustrated in FIG. 3B. FIG. 3B is a cross-sectional view of a display panel 110 according to a modification of the first embodiment. As in the above-described display panel 10, the display panel 110 according to the present modification includes a first substrate 112, a liquid crystal layer 113, a second substrate 114, a first polarization plate 115, and a second polarization plate 116.

A common electrode CE is disposed on a principal surface 112*a* of the first substrate 112. An insulating layer IL is disposed on the front surface of the common electrode CE, and in addition, sub pixel electrodes PE and an alignment film AL are disposed on the insulating layer IL. The sub pixel electrodes PE are disposed between the insulating layer IL and the alignment film AL.

Furthermore, light-shielding films SM, color filters CF, and another alignment film AL are disposed on the back surface of the second substrate 114. The light-shielding films SM and the color filters CF are disposed between the second substrate 114 and the alignment film AL. In FIG. 3B, illustrations of signal lines Lb and scanning lines Lc are omitted.

The following describes operation of the display panel 10. The description is first made on a case in which the display panel 10 is a normally black system and black is displayed in the display region DA. In this case, the drive circuit 11 does not drive the sub pixels S and no electric field is generated in the liquid crystal layer 13. Thus, the orientation of the liquid crystal molecules LM is regulated by the alignment films AL.

Light from the illumination apparatus 20 is incident on the first polarization plate 15 from the back surface side of the display panel 10. The light transmitted through the first polarization plate 15 is linearly polarized light having a polarization axis parallel to the transmission axis of the first polarization plate 15. The light transmitted through the first polarization plate 15 is transmitted through the first substrate 12 and is incident on the liquid crystal layer 13.

When the orientation of the liquid crystal molecules LM is regulated by the alignment films AL, the polarization axis of the light is not rotated in the liquid crystal layer 13. The light transmitted through the liquid crystal layer 13 is transmitted through the second substrate 14 and is incident on the second polarization plate 16.

The polarization axis of the light transmitted through the liquid crystal layer 13 and the second substrate 14 is orthogonal to the transmission axis of the second polarization plate 16, and thus the light transmitted through the liquid crystal layer 13 is not transmitted through the second polarization plate 16. Thus, when the orientation of the liquid crystal molecules LM is regulated by the alignment films AL, the light from the illumination apparatus 20 is not transmitted through the sub pixels S. Thus, black is displayed in the display region DA.

The following describes operation of the display panel 10 in a case in which an image is displayed in the display region DA. In this case, sub pixel signals generated by the signal processing circuit 11*a* are output to the plurality of sub pixels S through the signal output circuit 11*b*. The sub pixel signals include sub gradation data indicating the gradations of the sub pixels S as described later.

As the sub pixels S are scanned by the scanning circuit 11*c*, each switching element SW is operated and a sub pixel signal is transmitted to the corresponding sub pixel electrode PE. With this operation, a potential difference between the common electrode CE and the sub pixel electrode PE is generated and thus an electric field is generated in the liquid crystal layer 13, and as a result, the orientation of the liquid crystal molecules LM changes. The orientation of the liquid crystal molecules LM is an orientation in accordance with the sub gradation data. Thus, the orientation of the polarization axis of light changes in accordance with the sub gradation data in the liquid crystal layer 13. In the light transmitted through the liquid crystal layer 13, light having a polarization axis not orthogonal to the polarization axis of the second polarization plate 16 is transmitted through the second polarization plate 16.

The luminance of the light transmitted through the second polarization plate 16 is a luminance in accordance with the sub gradation data. In this manner, as the orientation of the liquid crystal molecules LM is adjusted with the sub pixel signal, the light transmission ratio of the liquid crystal layer 13, in other words, the luminance of light passing through the liquid crystal layer 13 is adjusted. Light transmitted through each color filter CF on the first substrate 12 has a color corresponding to the color of the color filter CF. Thus, light transmitted through the second polarization plate 16 has a color corresponding to the color of each color filter CF and has the adjusted luminance.

At each of the plurality of sub pixels S, the color of the color filter CF, in other words, the color of light passing through the second polarization plate 16 corresponds to the color of the sub pixel S. In addition, at each of the plurality of sub pixels S, the luminance of light passing through the second polarization plate 16 is adjusted in accordance with the gradation data. Thus, an image based on image signals is displayed in the display region DA. The display panel 10 may be a normally white system.

Figure 4:
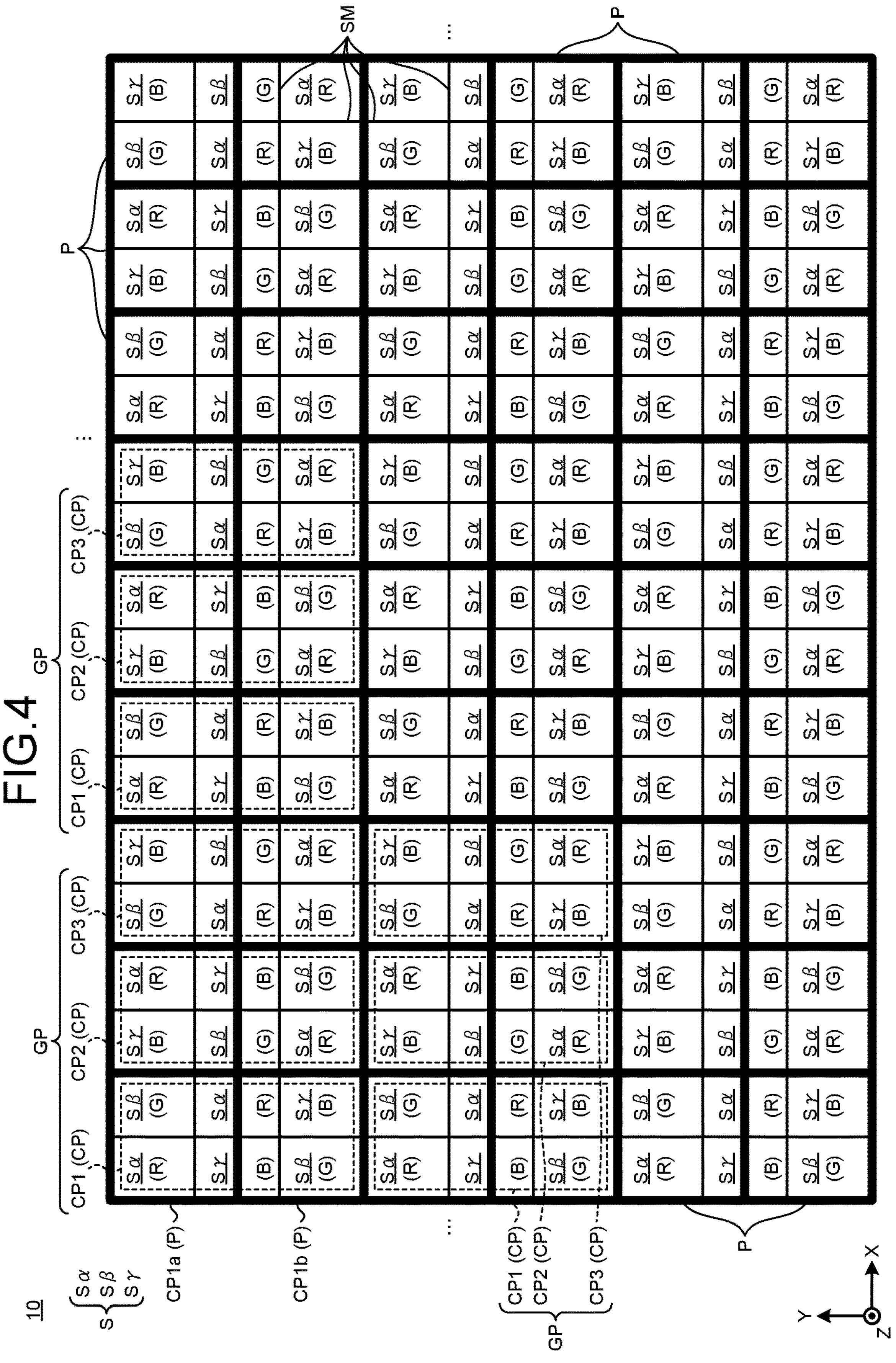
FIG. 4 is a diagram illustrating a plan view of the display panel.

The following describes an array of the plurality of sub pixels S in the display region DA with reference to FIG. 4.

FIG. 4 is a diagram illustrating a plan view of the display panel 10. The plurality of sub pixels S in FIG. 4 are illustrated with the color filters CF and the light-shielding films SM. In a plan view, the plurality of sub pixels S are partitioned by the light-shielding films SM and the color filters CF are rectangular.

The shapes of the plurality of sub pixels S are rectangular shapes identical to each other in a plan view. Specifically, the shapes are a rectangular shape in a plan view, the X-directional length of which is longer than the Y-directional length. The shapes of the plurality of sub pixels S are not limited to rectangular shapes in a plan view. The plurality of sub pixels S are disposed in a matrix of a row-column configuration in the X and Y directions in the display region DA.

The plurality of sub pixels S include a plurality of first sub pixels Sα, a plurality of second sub pixels Sβ, and a plurality of third sub pixels Sγ. The colors of the color filters CF, in other words, the colors of the sub pixels S are different from one another between the first sub pixels Sα, the second sub pixels Sβ, and the third sub pixels Sγ. The color of the first sub pixels Sa are red. The color of the second sub pixels Sβ, are green. The color of the third sub pixels Sγ are blue. The colors of the sub pixels S are not limited thereto, and the color of the first sub pixels Sα, the color of the second sub pixels Sβ, and the color of the third sub pixels Sγ only need to be different from one another. In FIG. 4, a reference sign in parentheses indicates the color of the corresponding sub pixel S, where "R" is red, "G" is green, and "B" is blue. When the first sub pixels Sα, the second sub pixels Sβ, and the third sub pixels Sγ need not be distinguished from one another and common matters thereto are described, they are simply referred to as "sub pixels S" in some cases.

The plurality of first sub pixels Sα, the plurality of second sub pixels Sβ, and the plurality of third sub pixels Sγ are arrayed in the arrangement illustrated in FIG. 4. The array of the sub pixels S illustrated in FIG. 4 is referred to as an SQy2 array. Specifically, in a plan view of the SQy2 array, the first, second, and third sub pixels Sα, Sβ, and Sγ are repeatedly disposed in the X direction in the order as listed, and the first, third, and second sub pixels Sα, Sγ, and Sβ, are repeatedly disposed in the Y direction in the order as listed.

Each pixel P corresponding to an image signal output from the external device 3 is illustrated with bold lines illustrated in FIG. 4. The pixel P has a rectangular shape surrounded by the bold lines in a plan view. Specifically, the pixel P has a square shape in a plan view. The pixel P is not limited to a square shape in a plan view. The plurality of pixels P in the display region DA are arranged in a matrix of a row-column configuration in the X and Y directions.

Among the plurality of pixels P, two pixels P adjacent to each other are composed of six sub pixels S.

Specifically, six sub pixels S in each pair of pixels CP, which is composed of two pixels P adjacent to each other in the Y direction, are disposed in a matrix of a row-column configuration composed of three rows in the Y direction and two columns in the X direction. Hereinafter, a row positioned closest to the positive Y side among the three rows (the uppermost row among the three rows continusously arranged in plan view in FIG. 4) in each pair of pixels CP is referred to as a first row, and rows on the negative Y side (the lower side in FIG. 4) of the first row are sequentially referred to as a second row and a third row. In addition, in each pair of pixels CP, a column positioned closest to the negative X side of the two columns (left side column of the two columns continusously arranged in plan view in FIG. 4) is referred to as a first column, and a column on the positive X side of the first column (right side column of the two columns continuously arranged in plan view in FIG. 4) is referred to as a second column.

Each pair of pixels CP is composed of two first sub pixels Sα, two second sub pixels Sβ, and two third sub pixels Sγ. Since the plurality of sub pixels S are arrayed in the SQy2 array as described above, there are three pairs CP1, CP2, and CP3 of pixels, each pair having two first sub pixels Sα, two second sub pixels Sβ, and two third sub pixels Sγ the arrangements of which are different from one another between the three pairs. When the pairs CP1, CP2, and CP3 of pixels are not distinguished from one another and common matters thereto are described, they are simply referred to as "pairs of pixels CP" in some cases.

For example, in the pair CP1 of pixels positioned closest to the positive Y side and closest to the negative X side in FIG. 4, one first sub pixel Sa positioned on the positive Y side of the two first sub pixels Sa and one second sub pixel Sβ, positioned on the positive Y side of the two second sub pixels Sβ, are included in one pixel CP1*a* positioned on the positive Y side. Specifically, the one first sub pixels Sa is positioned on the first row and the first column and included in the one pixel CP1*a*. The one second sub pixels Sβ, is positioned on the first row and the second column and included in the one pixel CP1*a*.

In the pair CP1 of pixels, the other second sub pixel Sβ, positioned on the negative Y side of the two second sub pixels Sβ, and one third sub pixel Sγ positioned on the negative Y side of the two third sub pixels Sγ are included in the other pixel CP1*b* positioned on the negative Y side in the pair CP1 of pixels. Specifically, the other second sub pixel Sβ is positioned on the third row and the first column and included in the other pixel CP1*b*. The one third sub pixel Sγ is positioned on the third row and the second column and included in the other pixel CP1*b*.

In the pair CP1 of pixels, the other third sub pixel Sγ positioned on the positive Y side of the two third sub pixels Sγ and the other first sub pixel Sa positioned on the negative Y side of the two first sub pixels Sa are disposed across and included in both pixels CP1*a* and CP1*b* in the pair CP1 of pixels. Specifically, the other third sub pixel Sγ is positioned on the second row and the first column and included in both pixels CP1*a* and CP1*b*. The other first sub pixel Sa is positioned on the second row and the second column and included in both pixels CP1*a* and CP1*b*.

In each of the other third sub pixel Sγ and the other first sub pixel Sα, the area of a part included in the one pixel CP1*a* and the area of a part included in the other pixel CP1*b* are equal to each other in a plan view. In other words, the other third sub pixel Sγ and the other first sub pixel Sa are each equally divided in a plan view between the two pixels CP1*a* and CP1*b* constituting the pair CP1 of pixels.

In the pair CP2 of pixels adjacent to the above-described pair CP1 of pixels on the positive X side of the pair CP1 of pixels, the third sub pixels Sγ are disposed in place of the first sub pixels Sa of the above-described pair CP1 of pixels, the first sub pixels Sa are disposed in place of the second sub pixels Sβ, of the pair CP1 of pixels, and the second sub pixels Sβ, are disposed in place of the third sub pixels Sγ of the pair CP1 of pixels.

In the pair CP3 of pixels adjacent to the pair CP2 of pixels on the positive X side of the pair CP2 of pixels, the second sub pixels Sβ, are disposed in place of the first sub pixels Sa of the above-described pair CP1 of pixels, the third sub pixels Sγ are disposed in place of the second sub pixels Sβ, of the pair CP1 of pixels, and the first sub pixels Sa are disposed in place of the third sub pixels Sγ of the pair CP1 of pixels.

The group of the three pairs CP1, CP2, and CP3 of pixels is referred to as a group GP of pixels. The groups GP of pixels are arranged in a matrix of a row-column configuration in the X and Y directions in the display region DA. In this manner, in a case in which two pixels P (in other words, a pair CP of pixels) are composed of six sub pixels S, the shape of the sub pixels S in a plan view is closer to a square as compared to a case in which three sub pixels having colors different from one another are arrayed in a stripe shape to constitute one pixel, whereby image resolution can be increased.

The following describes processing that the drive circuit 11 generates a sub pixel signal based on an image signal. A plurality of image signals are transmitted corresponding to the plurality of pixels P. With this operation, the plurality of pixels P have color data and gradation data included in the respective image signals.

The color data includes first color data, second color data, and third color data having colors different from one another. The color of the first color data is the same as the color of the first sub pixels Sα. The color of the second color data is the same as the color of the second sub pixels S. The color of the third color data is the same as the color of the third sub pixels Sγ. Thus, each of the plurality of pixels P has the three pieces of color data having colors different from one another.

The gradation data includes first gradation data corresponding to the first color data, second gradation data corresponding to the second color data, and third gradation data corresponding to the third color data. Thus, each of the plurality of pixels P has the three pieces of gradation data corresponding to the three pieces of color data.

The drive circuit 11 generates, for each of the plurality of sub pixels S, sub gradation data indicating the gradation of the sub pixel S from the gradation data transmitted to the plurality of pixels P. For example, the drive circuit 11 can generate, from two image signals transmitted to a pair CP of pixels, the sub gradation data of the six sub pixels S included in the pair CP of pixels.

Specifically, since two image signals are transmitted to the pair CP of pixels, the pair CP of pixels has two pieces of the first color data, two pieces of the second color data, two pieces of the third color data, two pieces of the first gradation data, two pieces of the second gradation data, and two pieces of the third gradation data. As described above, the pair CP of pixels includes two first sub pixels Sα, two second sub pixels Sβ, and two third sub pixels Sγ.

Thus, the drive circuit 11 can generate two pieces of first sub gradation data, two pieces of second sub gradation data, and two pieces of third sub gradation data by simply allocating the two pieces of the first gradation data, the two pieces of the second gradation data, and the two pieces of the third gradation data to the two first sub pixels Sα, the two second sub pixels Sβ, and the two third sub pixels Sγ in a color corresponding manner.

However, what is called jaggy occurs to an image displayed in accordance with the sub pixel signals generated in this manner, which degrades display quality in some cases. Thus, the drive circuit 11 performs rendering processing that generates one sub pixel signal by using the gradation data of a plurality of pixels P, thereby improving display quality.

Figure 5:
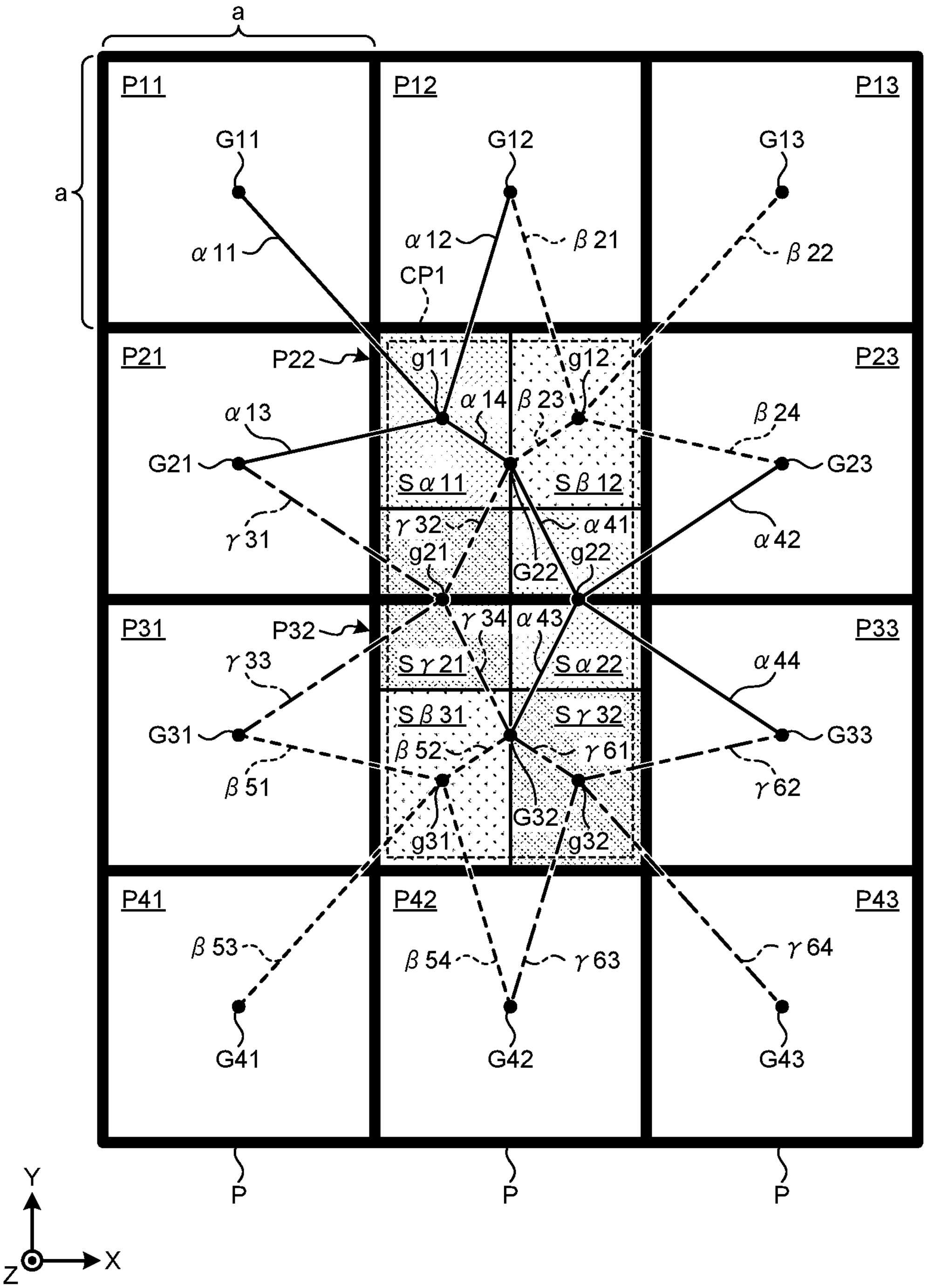
FIG. 5 is a diagram illustrating the relation between pixels and sub pixels in rendering processing executed for a pair of pixels in a group of pixels.

The following describes rendering processing performed when the drive circuit 11 generates sub pixel signals for six sub pixels S included in a pair CP of pixels. FIG. 5 is a diagram illustrating the relation between pixels P and sub pixels S in rendering processing executed for the pair CP1 of pixels in a group GP of pixels.

FIG. 5 illustrates a total of 12 pixels P including two pixels P constituting the pair CP1 of pixels in the group GP of pixels and a plurality (10) of pixels P adjacent to the pair CP1 of pixels. The 12 pixels P illustrated in FIG. 5 are disposed in a matrix of a row-column configuration composed of four rows in the X direction and three columns in the Y direction.

Hereinafter, in the 12 pixels P, a row positioned closest to the positive Y side among the four rows is referred to as a first row, and rows on the negative Y side of the first row are sequentially referred to as a second row, a third row, and a fourth row. In addition, in the 12 pixels P, a column positioned closest to the negative X side among the three columns is referred to as a first column, and columns on the positive X side of the first column are sequentially referred to as a second column and a third column.

For the purpose of description, a two-digit number indicating the position of a pixel P in the matrix is added to the reference sign of the pixel P. In the two-digit number, the first digit indicates a column number and the second digit indicates a row number. For example, a pixel P on the third row and the first column is referred to as a "pixel P31", and a pixel P on the second row and the third column is referred to as a "pixel P23".

Each point G illustrated in FIG. 5 represents the area centroid of the corresponding one of the 12 pixels P in a plan view. A number appended to each point G indicates the position of the corresponding pixel P in the matrix. For example, the area centroid of the pixel P31 is referred to as a "point G31", and the area centroid of the pixel P23 is referred to as a "point G23". In the first embodiment, since each pixel P has a square shape in a plan view, the area centroid of the pixel P is the intersection point of diagonal lines of the pixel P in a plan view and corresponds to the center of the pixel P.

In the pair CP1 of pixels illustrated in FIG. 5, the two first sub pixels Sα, the two second sub pixels Sβ, and the two third sub pixels Sγ are disposed in a matrix of a row-column configuration composed of three rows in the Y direction and two columns in the X direction as described above.

For the purpose of description, a two-digit number indicating the position of a sub pixel S in the matrix is added to the reference sign of the sub pixel S. In the two-digit number, the first digit indicates a column number and the second digit indicates a row number. For example, the first sub pixel Sa on the first row and the first column is referred to as a "first sub pixel Sα11", and the second sub pixel Sβ, on the first row and the second column is referred to as a "second sub pixel Sβ12". The third sub pixels Sγ on the second row and the first column is referred to as a "third sub pixel Sγ21", and the first sub pixel Sα on the second row and the second column is referred to as a "first sub pixel Sα22". The second sub pixel Sβ on the third row and the first column is referred to as a "second sub pixel Sβ31", and the third sub pixel Sγ on the third row and the second column is referred to as a "third sub pixel Sγ32".

Each point g illustrated in FIG. 5 represents the area centroid of the corresponding one of the six sub pixels S in a plan view. A number added to each point g indicates the position of the corresponding sub pixel S in the matrix. For example, the area centroid of the third sub pixel Sγ12 is referred to as a "point g12", and the area centroid of the third sub pixel Sγ31 is referred to as a "point g31". In the first embodiment, since each sub pixel S has a rectangular shape in a plan view, the area centroid of the sub pixel S is the intersection point of diagonals line of the sub pixel S in a plan view and corresponds to the center of the sub pixel S.

The drive circuit 11 generates the first sub gradation data included in a sub pixel signal for driving a first sub pixel Sα. The first sub gradation data is generated by using the first gradation data corresponding to the first color data having the same color as the color of the first sub pixel Sα among the gradation data of the plurality of pixels P. Specifically, the first sub gradation data is generated by using the first gradation data of pixels P adjacent to the first sub pixel Sα among the plurality of sub pixels S and the first gradation data of a pixel P including the first sub pixel Sα.

Specifically, pixels P adjacent to the first sub pixel Sα11 are the pixels P11, P12, and P21. A pixel P including the first sub pixel Sα11 is the pixel P22. Thus, the first sub gradation data of the first sub pixel Sα11 is generated by using the first gradation data of each of the pixels P11, P12, P21, and P22. In this manner, the first sub gradation data of the first sub pixel Sα11 and the first gradation data of each of the pixels P11, P12, P21, and P22 have a relation in generation of the first sub gradation data.

First virtual lines indicating this relation with solid lines are illustrated in FIG. 5. The first virtual lines are straight lines each connecting the area centroid of a first sub pixel Sα and the area centroid of a pixel P, and each indicate the relation between the first sub gradation data and a plurality of pieces of the first gradation data used to generate the first sub gradation data.

Specifically, a first virtual line α11 is a straight line connecting the points g11 and G11 and indicates that the first gradation data of the pixel P11 is used to generate the first sub gradation data of the first sub pixel Sα11. A first virtual line α12 is a straight line connecting the points g11 and G12 and indicates that the first gradation data of the pixel P12 is used to generate the first sub gradation data of the first sub pixel Sα11.

A first virtual line α13 is a straight line connecting the points g11 and G21 and indicates that the first gradation data of the pixel P21 is used to generate the first sub gradation data of the first sub pixel Sα11. A first virtual line α14 is a straight line connecting the points g11 and G22 and indicates that the first gradation data of the pixel P22 is used to generate the first sub gradation data of the first sub pixel Sα11.

Pixels P adjacent to the first sub pixel Sα22 are the pixels P23 and P33. Pixels P including the first sub pixel Sα22 are the pixels P22 and P32. Thus, the first sub gradation data of the first sub pixel Sα22 is generated by using the first gradation data of the pixel P23, the first gradation data of the pixel P33, the first gradation data of the pixel P22, and the first gradation data of the pixel P32.

A first virtual line α41 is a straight line connecting the points g22 and G22 and indicates that the first gradation data of the pixel P22 is used to generate the first sub gradation data of the first sub pixel Sα22. A first virtual line α42 is a straight line connecting the points g22 and G23 and indicates that the first gradation data of the pixel P23 is used to generate the first sub gradation data of the first sub pixel Sα22.

A first virtual line α43 is a straight line connecting the points g22 and G32 and indicates that the first gradation data of the pixel P32 is used to generate the first sub gradation data of the first sub pixel Sα22. A first virtual line α44 is a straight line connecting the points g22 and G33 and indicates that the first gradation data of the pixel P33 is used to generate the first sub gradation data of the first sub pixel Sα22. Each first virtual line may be a straight line connecting a point (for example, the center point of a side on the negative Y side) of a first sub pixel Sα other than its area centroid and a point (for example, the center point of a side on the negative Y side) of a pixel P other than its area centroid.

The drive circuit 11 also generates the second sub gradation data included in a sub pixel signal for driving a second sub pixel S. The second sub gradation data is generated by using the second gradation data corresponding to the second color data having the same color as the color of the second sub pixel Sβ, among the gradation data of the plurality of pixels P. Specifically, the second sub gradation data is generated by using the second gradation data of pixels P adjacent to the second sub pixel Sβ, among the plurality of sub pixels S and the second gradation data of a pixel P including the second sub pixel S.

Specifically, pixels P adjacent to the second sub pixel Sβ12 are the pixels P12, P13, and P23. A pixel P including the second sub pixel Sβ12 is the pixel P22. Thus, the second sub gradation data of the second sub pixel Sβ12 is generated by using the second gradation data of each of the pixels P12, P13, P23, and P22. In this manner, the second sub gradation data of the second sub pixel Sβ12 and the second gradation data of each of the pixels P12, P13, P23, and P22 have a relation in generation of the second sub gradation data.

Second virtual lines indicating this relation with dashed lines are illustrated in FIG. 5. The second virtual lines are straight lines each connecting the area centroid of the second sub pixel Sβ and the area centroid of a pixel P, and each indicate the relation between the second sub gradation data and a plurality of pieces of the second gradation data used to generate the second sub gradation data.

Specifically, a second virtual line β21 is a straight line connecting the points g12 and G12 and indicates that the second gradation data of the pixel P12 is used to generate the second sub gradation data of the second sub pixel Sβ12. A second virtual line β22 is a straight line connecting the points g12 and G13 and indicates that the second gradation data of the pixel P13 is used to generate the second sub gradation data of the second sub pixel Sβ12.

A second virtual line β23 is a straight line connecting the points g12 and G22 and indicates that the second gradation data of the pixel P22 is used to generate the second sub gradation data of the second sub pixel Sβ12. A second virtual line β24 is a straight line connecting the points g12 and G23 and indicates that the second gradation data of the pixel P23 is used to generate the second sub gradation data of the second sub pixel Sβ12.

Pixels P adjacent to the second sub pixel Sβ31 are the pixels P31, P41, and P42. A pixel P including the second sub pixel Sβ31 is the pixel P32. Thus, the second sub gradation data of the second sub pixel Sβ31 is generated by using the second gradation data of the pixel P31, the second gradation data of the pixel P41, the second gradation data of the pixel P42, and the second gradation data of the pixel P32.

A second virtual line β51 is a straight line connecting the points g31 and G31 and indicates that the second gradation data of the pixel P31 is used to generate the second sub gradation data of the second sub pixel Sβ31. A second virtual line β52 is a straight line connecting the points g31 and G32 and indicates that the second gradation data of the pixel P32 is used to generate the second sub gradation data of the second sub pixel Sβ31.

A second virtual line β53 is a straight line connecting the points g31 and G41 and indicates that the second gradation data of the pixel P41 is used to generate the second sub gradation data of the second sub pixel Sβ31. A second virtual line β54 is a straight line connecting the points g31 and G42 and indicates that the second gradation data of the pixel P42 is used to generate the second sub gradation data of the second sub pixel Sβ31. Each second virtual line may be a straight line connecting a point (for example, the center point of a side on the negative Y side) of the second sub pixel Sβ, other than its area centroid and a point (for example, the center point of a side on the negative Y side) of a pixel P other than its area centroid.

The drive circuit 11 also generates the third sub gradation data included in a sub pixel signal for driving a third sub pixel Sγ. The third sub gradation data is generated by using the third gradation data corresponding to the third color data having the same color as the color of the third sub pixels Sγ among the gradation data of the plurality of pixels P. Specifically, the third sub gradation data is generated by using the third gradation data of pixels P adjacent to the third sub pixel Sγ among the plurality of sub pixels S and the third gradation data of a pixel P including the third sub pixel Sγ.

Specifically, pixels P adjacent to the third sub pixel Sγ21 are the pixels P21 and P31. Pixels P including the third sub pixel Sγ21 are the pixels P22 and P32. Thus, the third sub gradation data of the third sub pixel Sγ21 is generated by using the third gradation data of each of the pixels P21, P31, P22, and P32. In this manner, the third sub gradation data of the third sub pixel Sγ21 and the third gradation data of each of the pixels P21, P31, P22, and P32 have a relation in generation of the third sub gradation data.

Third virtual lines indicating this relation with dashed-dotted lines are illustrated in FIG. 5. The third virtual lines are straight lines each connecting the area centroid of a third sub pixel Sγ and the area centroid of a pixel P, and each indicate the relation between the third sub gradation data and a plurality of pieces of the third gradation data used to generate the third sub gradation data.

Specifically, a third virtual line γ31 is a straight line connecting the points g21 and G21 and indicates that the third gradation data of the pixel P21 is used to generate the third sub gradation data of the third sub pixel Sγ21. A third virtual line γ32 is a straight line connecting the points g21 and G22 and indicates that the third gradation data of the pixel P22 is used to generate the second sub gradation data of the third sub pixel Sγ21.

A third virtual line γ33 is a straight line connecting the points g21 and G31 and indicates that the third gradation data of the pixel P31 is used to generate the second sub gradation data of the third sub pixel Sγ21. A third virtual line γ34 is a straight line connecting the points g21 and G32 and indicates that the third gradation data of the pixel P32 is used to generate the third sub gradation data of the third sub pixel Sγ21.

Pixels P adjacent to the third sub pixel Sγ32 are the pixels P33, P42, and P43. A pixel P including the third sub pixel Sγ32 is the pixel P32. Thus, the third sub gradation data of the third sub pixel Sγ32 is generated by using the third gradation data of the pixel P33, the third gradation data of the pixel P42, the third gradation data of the pixel P43, and the third gradation data of the pixel P32.

A third virtual line γ61 is a straight line connecting the points g32 and G32 and indicates that the third gradation data of the pixel P32 is used to generate the third sub gradation data of the third sub pixel Sγ32. A third virtual line γ62 is a straight line connecting the points g32 and G33 and indicates that the third gradation data of the pixel P33 is used to generate the third sub gradation data of the third sub pixel Sγ32.

A third virtual line γ63 is a straight line connecting the points g32 and G42 and indicates that the third gradation data of the pixel P42 is used to generate the third sub gradation data of the third sub pixel Sγ32. A third virtual line γ64 is a straight line connecting the points g32 and G43 and indicates that the third gradation data of the pixel P43 is used to generate the third sub gradation data of the third sub pixel Sγ32. Each third virtual line may be a straight line connecting a point (for example, the center point of a side on the negative Y side) of a third sub pixel Sγ other than its area centroid and a point (for example, the center point of a side on the negative Y side) of a pixel P other than its area centroid. Hereinafter, when the first, second, and third virtual lines are not distinguished from one another and common matters thereto are described, they are simply referred to as virtual lines in some cases.

Although the relation between pixels P and sub pixels S in rendering processing executed for the pair CP1 of pixels in a group GP of pixels is illustrated in FIG. 5, the same relation between pixels P and sub pixels S exists for the other two pairs CP2 and CP3 of pixels in the group GP of pixels.

Figure 6:
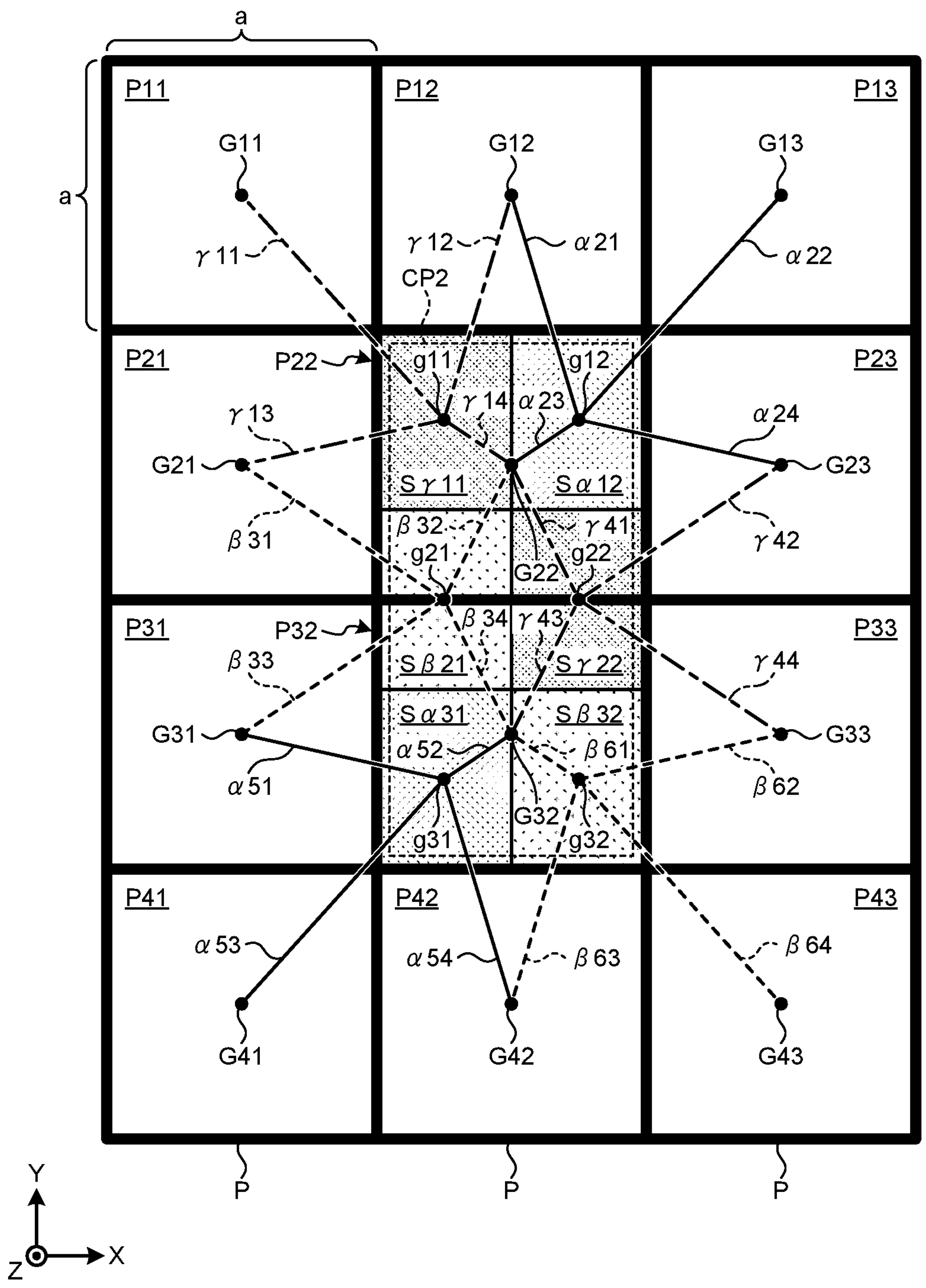
FIG. 6 is a diagram illustrating the relation between pixels and sub pixels in rendering processing executed for another pair of pixels in the group of pixels.

FIG. 6 is a diagram illustrating the relation between pixels P and sub pixels S in rendering processing executed for another pair CP2 of pixels in the group GP of pixels. FIG. 6 illustrates a total of 12 pixels P including two pixels P constituting the pair CP2 of pixels in the group GP of pixels and a plurality (10) of pixels P adjacent to the pair CP2 of pixels.

The positional relation among six sub pixels S is interchanged between the pairs CP1 and CP2 of pixels as described above. As a result, a virtual figure formed by the first virtual lines, the second virtual lines, and the third virtual lines has the same shape between the pairs CP1 and CP2 of pixels. However, in the pair CP2 of pixels, third virtual lines are disposed in place of the first virtual lines for the pair CP1 of pixels, first virtual lines are disposed in place of the second virtual lines for the pair CP1 of pixels, and second virtual lines are disposed in place of the third virtual lines for the pair CP1 of pixels. With this configuration, numbers added to the reference signs of virtual lines at the same position in the pairs CP1 and CP2 of pixels are equal to each other, but the kinds of the virtual lines are different from each other.

For example, a third virtual line γ11 of the virtual figure illustrated in FIG. 6 corresponds to the first virtual line α11 illustrated in FIG. 5. A second virtual line β63 of the virtual figure illustrated in FIG. 6 corresponds to the third virtual line γ63 of the virtual figure illustrated in FIG. 5.

Figure 7:
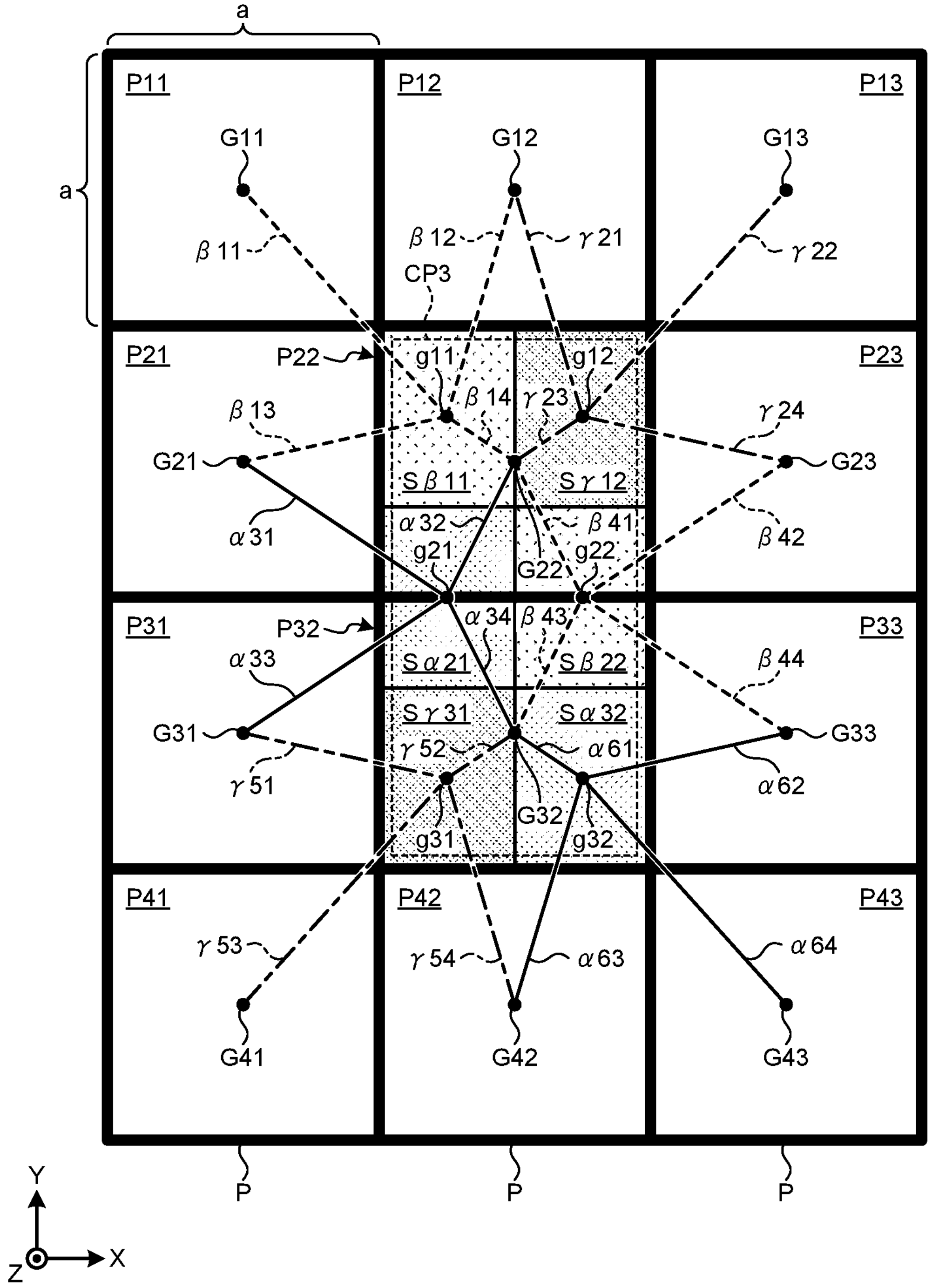
FIG. 7 is a diagram illustrating the relation between pixels and sub pixels in rendering processing executed for another pair of pixels in the group of pixels.

FIG. 7 is a diagram illustrating pixels P and sub pixels S in rendering processing executed for the other pair CP3 of pixels in the group GP of pixels. FIG. 7 illustrates a total of 12 pixels P including two pixels P constituting the pair CP3 of pixels in the group GP of pixels and a plurality (10) of pixels P adjacent to the pair CP3 of pixels.

The positional relation among six sub pixels S is interchanged as described above between the pairs CP1 and CP3 of pixels. As a result, a virtual figure formed by the first virtual lines, the second virtual lines, and the third virtual lines has the same shape in both the pairs CP1 and CP3 of pixels. However, in the pair CP3 of pixels, second virtual lines are disposed in place of the first virtual lines for the pair CP1 of pixels, third virtual lines are disposed in place of the second virtual lines for the pair CP1 of pixels, and first virtual lines are disposed in place of the third virtual lines for the pair CP1 of pixels. With this configuration, numbers added to the reference signs of virtual lines at the same position in the pairs CP1 and CP3 of pixels are equal to each other, but the kinds of the virtual lines are different from each other.

For example, a second virtual line β11 of the virtual figure illustrated in FIG. 7 corresponds to the first virtual line α11 illustrated in FIG. 5. A first virtual line α63 of the virtual figure illustrated in FIG. 7 corresponds to the third virtual line γ63 of the virtual figure illustrated in FIG. 5.

That is, numbers added to the reference signs of virtual lines at the same position among a plurality of virtual lines in the three pairs CP of pixels included in the group GP of pixels are equal to each other, but the kinds of the virtual lines at the same position are different from each other.

In this manner, six sub pixels S in each of the three pairs CP of pixels included in the group GP of pixels have a relation with a plurality of pixels P in generation of the first sub gradation data, the second sub gradation data, and the third sub gradation data. To generate the first sub gradation data of one first sub pixel Sα, the first gradation data of a plurality of pixels P related to the one first sub pixel Sα is used. To generate the second sub gradation data of one second sub pixel Sβ, the second gradation data of a plurality of pixels P related to the one second sub pixel Sβ, is used. To generate the third sub gradation data of one third sub pixel Sγ, the third gradation data of a plurality of pixels P related to the one third sub pixel Sγ is used.

In other words, the first gradation data of one pixel P is used to generate the first sub gradation data of a plurality of first sub pixels Sα related to the one pixel P. The second gradation data of one pixel P is used to generate the second sub gradation data of a plurality of second sub pixels Sβ, related to the one pixel P. The third gradation data of one pixel P is used to generate the third sub gradation data of a plurality of third sub pixels Sγ related to the one pixel P.

Figure 8:
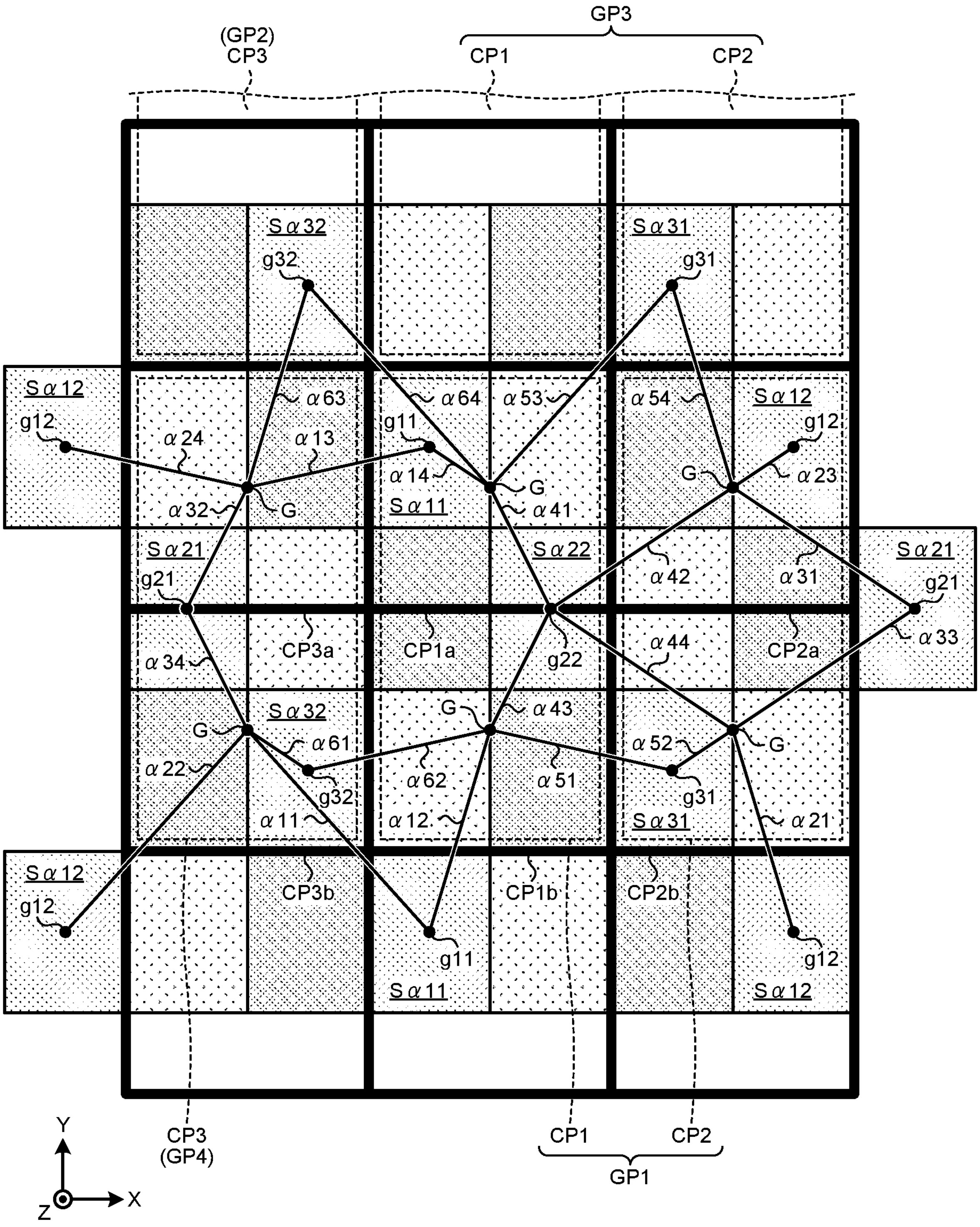
FIG. 8 is a diagram illustrating the relation between a pixel and a first sub pixel in rendering processing.

FIG. 8 is a diagram illustrating the relation between pixels P and first sub pixels Sα in rendering processing. Specifically, FIG. 8 illustrates that the first gradation data of one pixel P is used to generate the first sub gradation data of a plurality of first sub pixels Sα related to the one pixel P.

Specifically, the first gradation data of each of a plurality of pixels P is used to generate the first sub gradation data of a first sub pixel Sα adjacent to the pixel P and the first sub gradation data of a first sub pixel Sα included in the pixel P. A number of a first virtual line illustrated in FIG. 8 is a number of a first virtual line in pairs CP of pixels including first sub pixel Sα corresponding to the first virtual line.

For example, the first gradation data of one pixel CP1*a* positioned on the positive Y side in the pair CP1 of pixels in a group GP1 of pixels is used to generate the first sub gradation data of the two first sub pixels Sα11 and Sα22 included in the one pixel CP1*a*. The first gradation data of the one pixel CP1*a* is also used to generate the first sub gradation data of the first sub pixel Sα32 included in the pair CP3 of pixels in another group GP2 of pixels and the first sub gradation data of the first sub pixel Sα31 included in the pair CP2 of pixels in another group GP3 of pixels.

Although FIG. 8 illustrates that the first gradation data of one pixel P is used to generate the first sub gradation data of a plurality of first sub pixels Sα related to the one pixel P, similarly, the second gradation data of one pixel P is used to generate the second sub gradation data of a plurality of second sub pixels Sβ, related to the one pixel P. Similarly, the third gradation data of one pixel P is used to generate the third sub gradation data of a plurality of third sub pixels Sγ related to the one pixel P.

Figure 9:
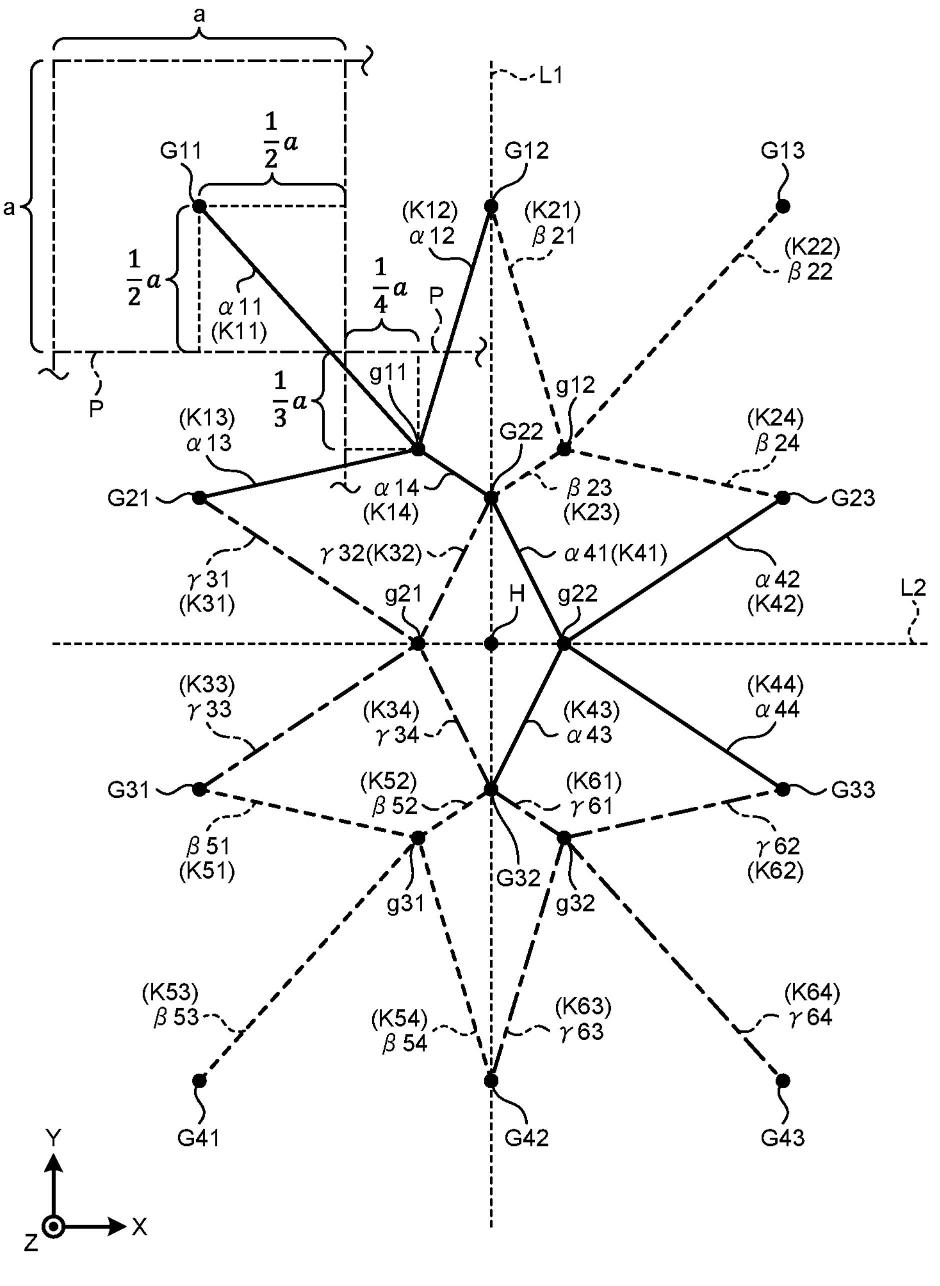
FIG. 9 is a diagram illustrating a virtual figure formed by a plurality of first virtual lines, a plurality of second virtual lines, and a plurality of third virtual lines in a pair of pixels.

FIG. 9 is a diagram illustrating a virtual figure formed by a plurality of first virtual lines, a plurality of second virtual lines, and a plurality of third virtual lines in a pair CP of pixels. FIG. 9 illustrates a virtual figure of a pair CP1 of pixels.

As described above, a plurality of pixels P have the same square shape in a plan view, and a plurality of sub pixels S have the same rectangular shape. In a pair CP of pixels, sub pixels S disposed across two pixels P, in other words, two sub pixels S on the second row in the pair CP of pixels are each equally divided.

Thus, a virtual figure formed by a plurality of first virtual lines, a plurality of second virtual lines, and a plurality of third virtual lines in the pair CP of pixels has a symmetric shape with respect to two straight lines L1 and L2 serving as axes of symmetry in a plan view. The two straight lines L1 and L2 pass through a point H. The point H is the area centroid of the pair CP of pixels.

Specifically, in the virtual figure, the straight line L1 extends in the Y direction through the point H. The straight line L1 passes through the points G12, G22, G32, and G42. The straight line L2 extends in the X direction through the point H of the pair CP of pixels. The straight line L2 passes through the points G21 and G22. The two straight lines L1 and L2 are orthogonal to each other at the point H. Thus, the virtual figure of the pair CP of pixels has a symmetric shape with respect to the point H that is a fixed point and is the area centroid of the pair CP of pixels.

The drive circuit 11 generates the first sub gradation data by using the first gradation data multiplied by a coefficient that weights the first gradation data. The coefficient that weights the first gradation data is associated with a first virtual line in accordance with the relation between a plurality of pieces of the gradation data and the first gradation data. The drive circuit 11 also generates the second sub gradation data by using the second gradation data multiplied by a coefficient that weights the second gradation data. The coefficient that weights the second gradation data is associated with a second virtual line in accordance with the relation between a plurality of pieces of the gradation data and the second gradation data. The drive circuit 11 also generates the third sub gradation data by using the third gradation data multiplied by a coefficient that weights the third gradation data. The coefficient that weights the third gradation data is associated with a third virtual line in accordance with the relation between a plurality of pieces of the gradation data and the third gradation data.

For the purpose of description, a coefficient that weights the gradation data is denoted by the same two-digit number as a two-digit number added to the reference sign of a virtual line, and in FIG. 9, the reference sign of the coefficient related to a virtual line is illustrated in parentheses near the reference sign of the virtual line.

For example, the first virtual line α11, which indicates that the first gradation data of the pixel P11 is used to generate the first sub gradation data of the first sub pixel Sα11, is associated with a coefficient K11 that weights the first gradation data of the pixel P11. The first virtual line α12, which indicates that the first gradation data of the pixel P12 is used to generate the first sub gradation data of the first sub pixel Sα11, is associated with a coefficient K12 that weights the first gradation data of the pixel P12.

The first virtual line α13, which indicates that the first gradation data of the pixel P21 is used to generate the first sub gradation data of the first sub pixel Sα11, is associated with a coefficient K13 that weights the first gradation data of the pixel P21. The first virtual line α14, which indicates that the first gradation data of the pixel P22 is used to generate the first sub gradation data of the first sub pixel Sα11, is associated with a coefficient K14 that weights the first gradation data of the pixel P22.

Each coefficient is determined to be smaller as the distance between a first sub pixel Sα and a pixel P in a plan view is longer. Specifically, each coefficient is determined to be smaller as the distance between the area centroid of a first sub pixel Sα and the area centroid of a pixel P in a plan view is longer. Thus, a coefficient associated with a first virtual line is smaller as the length of the first virtual line is longer.

For example, as illustrated in FIG. 9, the distance from the point G11 to a side of a pixel P is (½)×a, where "a" represents the length of each side of the pixel P. The distance from the point g11 to one side of a pixel P on the negative X side of the point g11 is (¼)×a. The distance from the point g11 to one side of a pixel P on the positive Y side of the point g11 is (⅓)×a.

Therefore, the length of the first virtual line α11, the length of the first virtual line α12, the length of the first virtual line α13, and the length of the first virtual line α14 are 1.12×a, 0.87×a, 0.77×a, and 0.3a and are smaller in the order as listed. Thus, when determined based on the reciprocal of the length of an associated virtual line, a coefficient is smaller as the virtual line is longer. Specifically, the ratio of the coefficients K11, K12, K13, and K14 is set to be (1/1.12):(1/0.87):(1/0.77):(1/0.3) approximately.

Since one piece of the first gradation data is used to generate a plurality of pieces of the first sub gradation data as described above, coefficients are determined to be values with which the first gradation data is appropriately distributed to a plurality of pieces of the first sub gradation data. Thus, each coefficient is expressed as a fraction having a predetermined value determined in advance as a denominator.

The predetermined value is defined as a binary number. This is because the first gradation data is defined as a binary number. The predetermined value is defined to be a binary number equal to or larger than 16 so that the first gradation data is appropriately distributed in accordance with coefficients. In the first embodiment, the predetermined value is 16, with which the time of calculation by the drive circuit 11 is relatively short, but is not limited to this value.

The sum of a plurality of coefficients that respectively multiply a plurality of pieces of the first gradation data used to generate one piece of the first sub gradation data is set to 1. For example, in FIG. 9, the sum of the coefficients K11, K12, K13, and K14 is set to 1.

Thus, it is set that the ratio of the coefficients K11, K12, K13, and K14 is the above-described ratio approximately, the denominator of each of the coefficients K11, K12, K13, and K14 is 16, and the sum of the coefficients K11, K12, K13, and K14 is 1. Specifically, the coefficients K11, K12, K13, and K14 are 2.14/16, 2.76/16, 3.12/16, and 7.98/16.

The coefficients K11, K12, K13, and K14 are determined to be 2/16, 3/16, 3/16, and 8/16 by performing, on the numerators of the above-described coefficients K11, K12, K13, and K14, rounding processing that rounds up or down decimal numbers. With this operation, the numerators become integers and the coefficients become values that can be easily handled by the drive circuit 11. The above-described rounding processing does not necessarily need to be performed.

Similarly to the above-described first sub pixel Sα11, coefficients K41, K42, K43, and K44 are determined for the first sub pixel Sα22.

The length of the first virtual line α41, the length of the first virtual line α42, the length of the first virtual line α43, and the length of the first virtual line α44 are 0.9×a, 0.56×a, 0.9×a, and 0.56a. Thus, the ratio of the coefficients K41, K42, K43, and K44 is set to (1/0.9):(1/0.56):(1/0.9):(1/0.56) approximately.

Moreover, the denominators of the coefficients K41, K42, K43, and K44 are set to 16, the sum of the coefficients K41, K42, K43, and K44 is set to 1, and the coefficients are rounded to values that can be easily handled the drive circuit 11. Specifically, the coefficients K41, K42, K43, and K44 are determined to be 3/16, 5/16, 3/16, and 5/16.

As described above, the virtual figure illustrated in FIG. 9 has a shape that is symmetric with respect to a point. Therefore, the lengths of two virtual lines having a point-symmetric relation among a plurality of virtual lines are equal to each other. Moreover, the virtual figure has a symmetric shape with respect to the two straight lines L1 and L2 serving as axes of symmetry. Thus, among the plurality of virtual lines, the lengths of two virtual lines having a line-symmetric relation are equal to each other.

Specifically, the lengths of the first virtual line α11, the second virtual line β22, the second virtual line β53, and the third virtual line γ64 are equal to one another. The lengths of the first virtual line α12, the second virtual line β21, the second virtual line β54, and the third virtual line γ63 are equal to one another. The lengths of the first virtual line α13, the second virtual line β24, the second virtual line β51, and the third virtual line γ62 are equal to one another.

The lengths of the first virtual line α14, the second virtual line β23, the second virtual line β52, and the third virtual line γ61 are equal to one another. The lengths of the third virtual line γ31, the first virtual line α44, the third virtual line γ33, and the first virtual line α42 are equal to one another. The lengths of the third virtual line γ32, the first virtual line α43, third virtual line γ34, and the first virtual line α41 are equal to one another.

In the first embodiment, the values of coefficients associated with virtual lines in a pair CP of pixels are determined as listed in Table 1. In this case, the values of coefficients related to two virtual lines having a line-symmetric relation with respect to the two straight lines L1 and L2 serving an axes of symmetry among a plurality of virtual lines and the values of coefficients related to two virtual lines having a point-symmetric relation among the plurality of virtual lines are set to be equal to one another. Table 1 lists the reference signs of virtual lines as well as the reference signs and values of coefficients related to the virtual lines.

Specifically, in the first embodiment, the values of six coefficients among 24 coefficients, namely, the values of the coefficients K11, K12, K13, K14, K31, and K32 are determined based on distance as described above. Then, the values of coefficients corresponding to virtual lines having lengths equal to the lengths of virtual lines of the coefficients K11, K12, K13, K14, K31, and K32 are set to be equal to the values of the coefficients K11, K12, K13, K14, K31, and K32.

TABLE 1

| CP1 | | | | | |
|---|---|---|---|---|---|
| Virtual line | Coefficient | | Virtual line | Coefficient | |
| α11 | K11 | 2/16 | β21 | K21 | 3/16 |
| α12 | K12 | 3/16 | β22 | K22 | 2/16 |
| α13 | K13 | 3/16 | β23 | K23 | 8/16 |
| α14 | K14 | 8/16 | β24 | K24 | 3/16 |
| | Sum | 1 | | Sum | 1 |
| γ31 | K31 | 3/16 | α41 | K41 | 5/16 |
| γ32 | K32 | 5/16 | α42 | K42 | 3/16 |
| γ33 | K33 | 3/16 | α43 | K43 | 5/16 |
| γ34 | K34 | 5/16 | α44 | K44 | 3/16 |
| | Sum | 1 | | Sum | 1 |

TABLE 1-continued

| CP1 | | | | | |
|---|---|---|---|---|---|
| Virtual line | Coefficient | | Virtual line | Coefficient | |
| β51 | K51 | 3/16 | γ61 | K61 | 8/16 |
| β52 | K52 | 8/16 | γ62 | K62 | 3/16 |
| β53 | K53 | 2/16 | γ63 | K63 | 3/16 |
| β54 | K54 | 3/16 | γ64 | K64 | 2/16 |
| | Sum | 1 | | Sum | 1 |

In a case in which the values of coefficients are determined as in Table 1, a storage region in which the values of coefficients are stored in the display device 1 can be reduced as compared to a case in which values different from one another are determined for a plurality of coefficients corresponding to a plurality of virtual lines having a point-symmetric or line-symmetric relation. In the first embodiment, when the difference between the lengths of two virtual lines is relatively small, the values of coefficients corresponding to the two virtual lines are determined to be equal to one another. For example, the values of the coefficients K12 and K13 related to the first virtual line α12 and the first virtual line α13 the length difference between which is relatively small are equal to each other. Thus, in the display device 1, the storage region in which a plurality of coefficients are stored can be further reduced. The values of a plurality of coefficients corresponding to a plurality of virtual lines having a point-symmetric or line-symmetric relation may be different from one another.

The drive circuit 11 generates, as the first sub gradation data of one first sub pixel Sα, the sum of a plurality of values obtained by multiplying the first gradation data by coefficients related to respective pieces of the first gradation data of a plurality of pixels P related to the one first sub pixel Sα. Specifically, first sub pixel data of the first sub pixel Sα11 can be expressed by a matrix equation of Expression (1), and first sub pixel data of the first sub pixel Sα22 can be expressed by a matrix equation of Expression (2).

$$S11\alpha = [K11, K12, K13, K14]\begin{bmatrix} P11\alpha \\ P12\alpha \\ P21\alpha \\ P22\alpha \end{bmatrix} \quad (1)$$

In Expression (1), "S11α" represents the first sub gradation data of the first sub pixel Sα11, "P11α" represents the first gradation data of the pixel P11, "P12α" represents the first gradation data of the pixel P12, "P21α" represents the first gradation data of the pixel P21, and "P22α" represents the first gradation data of the pixel P22.

$$S22\alpha = [K41, K42, K43, K44]\begin{bmatrix} P22\alpha \\ P23\alpha \\ P32\alpha \\ P33\alpha \end{bmatrix} \quad (2)$$

In Expression (2), "S22α" represents the first sub gradation data of the first sub pixel Sα22, "P22α" represents the first gradation data of the pixel P22, "P23α" represents the first gradation data of the pixel P23, "P32α" represents the first gradation data of the pixel P32, and "P33α" represents the first gradation data of the pixel P33.

When generating the first sub gradation data for pairs CP of pixels positioned on the periphery of the display region DA, the drive circuit 11 generates virtual pixels VP outside the display region DA.

Figure 10:
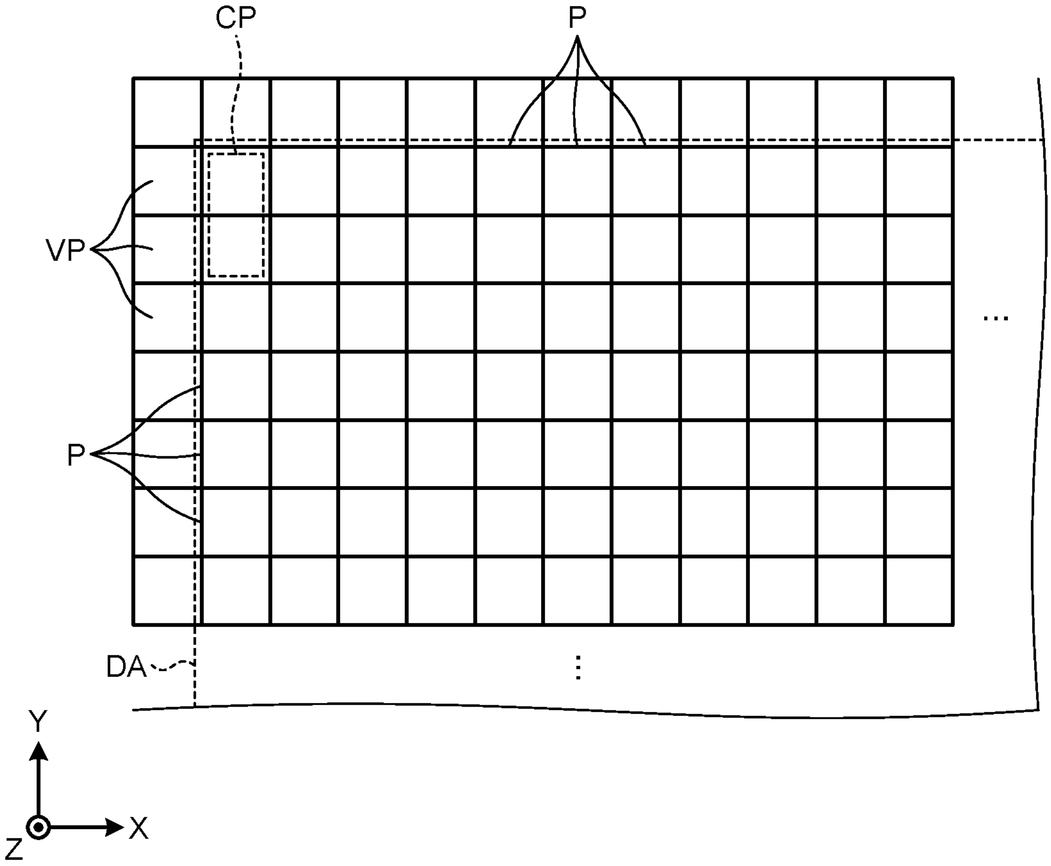
FIG. 10 is a diagram illustrating virtual pixels.

FIG. 10 is a diagram illustrating the virtual pixels VP. The virtual pixels VP outside the display region DA are adjacent to pixels P in the display region DA and disposed in a matrix of a row-column configuration together with the pixels P in the display region DA. The drive circuit 11 sets the gradation data of each virtual pixel VP to be the same as the gradation data of the corresponding pixel P located in the display region DA and adjacent to the virtual pixel VP.

Then, when generating the first sub gradation data of a first sub pixel Sα included in a pair CP of pixels positioned in the periphery of the display region DA, the drive circuit 11 uses the first gradation data included in the gradation data of the corresponding virtual pixel VP. With this operation, the drive circuit 11 can generate the first sub gradation data for the pair CP of pixels positioned in the periphery of the display region DA by using Expressions (1) and (2).

Similarly to the above-described generation of the first sub gradation data, the second sub gradation data and the third sub gradation data are generated for the pair CP1 of pixels.

Thus, the drive circuit 11 generates the second sub gradation data by using the second gradation data multiplied by a coefficient that weights the second gradation data. Specifically, the drive circuit 11 generates, as the second sub gradation data of one second sub pixel Sβ, the sum of a plurality of values obtained by multiplying the second gradation data by coefficients related to respective pieces of the second gradation data of a plurality of pixels P related to the one second sub pixel S. The second sub gradation data of the second sub pixel Sβ12 can be expressed by a matrix equation of Expression (3), and the second sub gradation data of the second sub pixel Sβ31 can be expressed by a matrix equation of Expression (4).

$$S12\beta = [K21, K22, K23, K24]\begin{bmatrix} P12\beta \\ P13\beta \\ P22\beta \\ P23\beta \end{bmatrix} \quad (3)$$

In Expression (3), "S12β" represents the second sub gradation data of the second sub pixel Sβ12, "P12β" represents the second gradation data of the pixel P12, "P13β" represents the second gradation data of the pixel P13, "P22β" represents the second gradation data of the pixel P22, and "P23β" represents the second gradation data of the pixel P23.

$$S31\beta = [K51, K52, K53, K54]\begin{bmatrix} P31\beta \\ P32\beta \\ P41\beta \\ P42\beta \end{bmatrix} \quad (4)$$

In Expression (4), "S31β" represents the second sub gradation data of the second sub pixel Sβ31, "P31β" represents the second gradation data of the pixel P31, "P32β" represents the second gradation data of the pixel P32, "P41β" represents the second gradation data of the pixel P41, and "P42β" represents the second gradation data of the pixel P42.

The drive circuit 11 generates the third sub gradation data by using the third gradation data multiplied by a coefficient that weights the third gradation data. Specifically, the drive circuit 11 generates, as the third sub gradation data of one third sub pixel Sγ, the sum of a plurality of values obtained by multiplying the third gradation data by coefficients related to respective pieces of the third gradation data of a plurality of pixels P related to the one third sub pixel Sγ. The third sub gradation data of the third sub pixel Sγ21 can be expressed by a matrix equation of Expression (5), and the third sub gradation data of the third sub pixel Sγ32 can be expressed by a matrix equation of Expression (6).

$$S21\gamma = [K31, K32, K33, K34]\begin{bmatrix} P21\gamma \\ P22\gamma \\ P31\gamma \\ P32\gamma \end{bmatrix} \quad (5)$$

In Expression (5), "S21γ" represents the third sub gradation data of the third sub pixel Sγ21, "P21γ" represents the third gradation data of the pixel P21, "P22γ" represents the third gradation data of the pixel P22, "P31γ" represents the third gradation data of the pixel P31, and "P32γ" represents the third gradation data of the pixel P32.

$$S32\gamma = [K61, K62, K63, K64]\begin{bmatrix} P32\gamma \\ P33\gamma \\ P42\gamma \\ P43\gamma \end{bmatrix} \quad (6)$$

In Expression (6), "S32γ" represents the third sub gradation data of the third sub pixel Sγ32, "P32γ" represents the third gradation data of the pixel P32, "P33γ" represents the third gradation data of the pixel P33, "P42γ" represents the third gradation data of the pixel P42, and "P43γ" represents the third gradation data of the pixel P43.

The above description is made on rendering processing for the pair CP1 of pixels illustrated in FIG. 5 among the three pairs CP of pixels included in a group GP of pixels illustrated in FIG. 2. Similarly to the above-described pair CP1 of pixels, rendering processing is executed for the pair CP2 of pixels illustrated in FIG. 6 as well.

The virtual figure formed by a plurality of virtual lines in the pair CP2 of pixels illustrated in FIG. 6 has the same shape as the virtual figure illustrated in FIG. 9 as described above, and the kinds of virtual lines are interchanged as compared to the virtual figure illustrated in FIG. 9. Thus, numbers added to the reference signs of virtual lines at the same position in the virtual figure of the pair CP2 of pixels illustrated in FIG. 6 and the virtual figure illustrated in FIG. 9 are equal to each other, but the kinds of the virtual lines at the same position are different from each other. For example, the third virtual line γ11 of the virtual figure illustrated in FIG. 6 corresponds to the first virtual line α11 of the virtual figure illustrated in FIG. 9.

Irrespective of the kind of a virtual line, the virtual line is associated with a coefficient based on the position of the virtual line in a virtual figure, in other words, a number added to the reference sign of the virtual line. For example, the third virtual line γ11 of the virtual figure illustrated in FIG. 6 is associated with the coefficient K11. Thus, the relation between the position of each virtual line and the corresponding coefficient illustrated in FIG. 6 is the same as the relation between the position of each virtual line and the corresponding coefficient illustrated in FIG. 9.

Thus, for the pair CP2 of pixels illustrated in FIG. 6, coefficients associated with virtual lines are determined as listed in Table 2. The values of the coefficients in Table 2 are the same as the values of the coefficients in Table 1.

TABLE 2

| CP2 | | | | | |
|---|---|---|---|---|---|
| Virtual line | Coefficient | | Virtual line | Coefficient | |
| γ11 | K11 | 2/16 | α21 | K21 | 3/16 |
| γ12 | K12 | 3/16 | α22 | K22 | 2/16 |
| γ13 | K13 | 3/16 | α23 | K23 | 8/16 |
| γ14 | K14 | 8/16 | α24 | K24 | 3/16 |
| | Sum | 1 | | Sum | 1 |
| β31 | K31 | 3/16 | γ41 | K41 | 5/16 |
| β32 | K32 | 5/16 | γ42 | K42 | 3/16 |
| β33 | K33 | 3/16 | γ43 | K43 | 5/16 |
| β34 | K34 | 5/16 | γ44 | K44 | 3/16 |
| | Sum | 1 | | Sum | 1 |
| α51 | K51 | 3/16 | β61 | K61 | 8/16 |
| α52 | K52 | 8/16 | β62 | K62 | 3/16 |
| α53 | K53 | 2/16 | β63 | K63 | 3/16 |
| α54 | K54 | 3/16 | β64 | K64 | 2/16 |
| | Sum | 1 | | Sum | 1 |

In addition, in the pair CP2 of pixels illustrated in FIG. 6, third sub pixel data of the third sub pixel Sγ11 can be expressed by a matrix equation of Expression (7), and third sub pixel data of the third sub pixel Sγ22 can be expressed by a matrix equation of Expression (8).

$$S11\gamma = [K11, K12, K13, K14]\begin{bmatrix} P11\gamma \\ P12\gamma \\ P21\gamma \\ P22\gamma \end{bmatrix} \quad (7)$$

In Expression (7), "S11γ" represents the third sub gradation data of the third sub pixel Sγ11, "P11γ" represents the third gradation data of the pixel P11, "P12γ" represents the third gradation data of the pixel P12, "P21γ" represents the third gradation data of the pixel P21, and "P22γ" represents the third gradation data of the pixel P22.

$$S22\gamma = [K41, K42, K43, K44]\begin{bmatrix} P22\gamma \\ P23\gamma \\ P32\gamma \\ P33\gamma \end{bmatrix} \quad (8)$$

In Expression (8), "S22γ" represents the third sub gradation data of the third sub pixel Sγ22, "P22γ" represents the third gradation data of the pixel P22, "P23γ" represents the third gradation data of the pixel P23, "P32γ" represents the third gradation data of the pixel P32, and "P33γ" represents the third gradation data of the pixel P33.

In addition, in the pair CP2 of pixels illustrated in FIG. 6, the first sub gradation data of the first sub pixel Sα12 can be expressed by a matrix equation of Expression (9), and the first sub gradation data of the first sub pixel Sα31 can be expressed by a matrix equation of Expression (10).

$$S12\alpha = [K21, K22, K23, K24]\begin{bmatrix} P12\alpha \\ P13\alpha \\ P22\alpha \\ P23\alpha \end{bmatrix} \quad (9)$$

In Expression (9), "S12α" represents the first sub gradation data of the first sub pixel Sα12, "P12α" represents the first gradation data of the pixel P12, "P13α" represents the first gradation data of the pixel P13, "P22α" represents the first gradation data of the pixel P22, and "P23α" represents the first gradation data of the pixel P23.

$$S31\alpha = [K51, K52, K53, K54]\begin{bmatrix} P31\alpha \\ P32\alpha \\ P41\alpha \\ P42\alpha \end{bmatrix} \quad (10)$$

In Expression (10), "S31α" represents the first sub gradation data of the first sub pixel Sα31, "P31α" represents the first gradation data of the pixel P31, "P32α" represents the first gradation data of the pixel P32, "P41α" represents the first gradation data of the pixel P41, and "P42α" represents the first gradation data of the pixel P42.

In addition, in the pair CP2 of pixels illustrated in FIG. 6, the second sub gradation data of the second sub pixel Sβ21 can be expressed by a matrix equation of Expression (11), and the second sub gradation data of the second sub pixel Sβ32 can be expressed by a matrix equation of Expression (12).

$$S21\beta = [K31, K32, K33, K34]\begin{bmatrix} P21\beta \\ P22\beta \\ P31\beta \\ P32\beta \end{bmatrix} \quad (11)$$

In Expression (11), "S21β" represents the second sub gradation data of the second sub pixel Sβ21, "P21β" represents the second gradation data of the pixel P21, "P22=" represents the second gradation data of the pixel P22, "P31β" represents the second gradation data of the pixel P31, and "P32β" represents the second gradation data of the pixel P32.

$$S32\beta = [K61, K62, K63, K64]\begin{bmatrix} P32\beta \\ P33\beta \\ P42\beta \\ P43\beta \end{bmatrix} \quad (12)$$

In Expression (12), "S32β" represents the second sub gradation data of the second sub pixel Sβ32, "P32β" represents the second gradation data of the pixel P32, "P33β" represents the second gradation data of the pixel P33, "P42β" represents the second gradation data of the pixel P42, and "P43β" represents the second gradation data of the pixel P43.

The above description is made on rendering processing for the pairs CP1 and CP2 of pixels illustrated in FIGS. 5 and 6 among the three pairs CP of pixels included in a group GP of pixels illustrated in FIG. 2. Similarly to the above-described pairs CP1 and CP2 of pixels, rendering processing is executed for the pair CP3 of pixels illustrated in FIG. 7 as well.

The virtual figure formed by a plurality of virtual lines in the pair CP3 of pixels illustrated in FIG. 7 has the same shape as the virtual figure illustrated in FIG. 9 as described above, and the kinds of virtual lines are interchanged as compared to the virtual figure illustrated in FIG. 9. Thus, numbers added to the reference signs of virtual lines at the same position in the virtual figure of the pair CP3 of pixels illustrated in FIG. 7 and the virtual figure illustrated in FIG. 9 are equal to each other, but the kinds of the virtual lines at the same position are different from each other. For example, the second virtual line β11 of the virtual figure illustrated in FIG. 7 corresponds to the first virtual line α11 of the virtual figure illustrated in FIG. 9.

Irrespective of the kind of a virtual line, the virtual line is associated with a coefficient based on the position of the virtual line in a virtual figure, in other words, a number added to the reference sign of the virtual line. For example, the second virtual line β11 of the virtual figure illustrated in FIG. 7 is associated with the coefficient K11. Thus, the relation between the position of each virtual line and the corresponding coefficient illustrated in FIG. 7 is the same as the relation between the position of each virtual line and the corresponding coefficient illustrated in FIG. 9.

Thus, for the pair CP3 of pixels illustrated in FIG. 7, coefficients associated with virtual lines are determined as listed in Table 3. The values of the coefficients in Table 3 are the same as the values of the coefficients in Table 1.

TABLE 3

| CP3 | | | | | |
|---|---|---|---|---|---|
| Virtual line | Coefficient | | Virtual line | Coefficient | |
| β11 | K11 | 2/16 | γ21 | K21 | 3/16 |
| β12 | K12 | 3/16 | γ22 | K22 | 2/16 |
| β13 | K13 | 3/16 | γ23 | K23 | 8/16 |
| β14 | K14 | 8/16 | γ24 | K24 | 3/16 |
| | Sum | 1 | | Sum | 1 |
| α31 | K31 | 3/16 | β41 | K41 | 5/16 |
| α32 | K32 | 5/16 | β42 | K42 | 3/16 |
| α33 | K33 | 3/16 | β43 | K43 | 5/16 |
| α34 | K34 | 5/16 | β44 | K44 | 3/16 |
| | Sum | 1 | | Sum | 1 |
| γ51 | K51 | 3/16 | α61 | K61 | 8/16 |
| γ52 | K52 | 8/16 | α62 | K62 | 3/16 |
| γ53 | K53 | 2/16 | α63 | K63 | 3/16 |
| γ54 | K54 | 3/16 | α64 | K64 | 2/16 |
| | Sum | 1 | | Sum | 1 |

In addition, in the pair CP3 of pixels illustrated in FIG. 7, second sub pixel data of the second sub pixel Sβ11 can be expressed by a matrix equation of Expression (13), and second sub pixel data of the second sub pixel Sβ22 can be expressed by a matrix equation of Expression (14).

$$S11\beta = [K11, K12, K13, K14]\begin{bmatrix} P11\beta \\ P12\beta \\ P21\beta \\ P22\beta \end{bmatrix} \quad (13)$$

In Expression (13), "S11β" represents the second sub gradation data of the second sub pixel Sβ11, "P11β" represents the second gradation data of the pixel P11, "P12β" represents the second gradation data of the pixel P12, "P21β" represents the second gradation data of the pixel P21, and "P22=" represents the second gradation data of the pixel P22.

$$S22\beta = [K41, K42, K43, K44]\begin{bmatrix} P22\beta \\ P23\beta \\ P32\beta \\ P33\beta \end{bmatrix} \tag{14}$$

In Expression (14), "S22β" represents the second sub gradation data of the second sub pixel Sβ22, "P22=" represents the second gradation data of the pixel P22, "P23β" represents the second gradation data of the pixel P23, "P32β" represents the second gradation data of the pixel P32, and "P33β" represents the second gradation data of the pixel P33.

In addition, in the pair CP3 of pixels illustrated in FIG. 7, the third sub gradation data of the third sub pixel Sγ12 can be expressed by a matrix equation of Expression (15), and the second sub gradation data of the third sub pixel Sγ31 can be expressed by a matrix equation of Expression (16).

$$S12\gamma = [K21, K22, K23, K24]\begin{bmatrix} P12\gamma \\ P13\gamma \\ P22\gamma \\ P23\gamma \end{bmatrix} \tag{15}$$

In Expression (15), "S12γ" represents the third sub gradation data of the third sub pixel Sγ12, "P12γ" represents the third gradation data of the pixel P12, "P13γ" represents the third gradation data of the pixel P13, "P22γ" represents the third gradation data of the pixel P22, and "P23γ" represents the third gradation data of the pixel P23.

$$S31\gamma = [K51, K52, K53, K54]\begin{bmatrix} P31\gamma \\ P32\gamma \\ P41\gamma \\ P42\gamma \end{bmatrix} \tag{16}$$

In Expression (16), "S31γ" represents the third sub gradation data of the third sub pixel Sγ31, "P31γ" represents the third gradation data of the pixel P31, "P32γ" represents the third gradation data of the pixel P32, "P41γ" represents the third gradation data of the pixel P41, and "P42γ" represents the third gradation data of the pixel P42.

In addition, in the pair CP3 of pixels illustrated in FIG. 7, the first sub gradation data of the first sub pixel Sα21 can be expressed by a matrix equation of Expression (17), and the first sub gradation data of the first sub pixel Sα32 can be expressed by a matrix equation of Expression (18).

$$S21\alpha = [K31, K32, K33, K34]\begin{bmatrix} P21\alpha \\ P22\alpha \\ P31\alpha \\ P32\alpha \end{bmatrix} \tag{17}$$

In Expression (17), "S21α" represents the first sub gradation data of the first sub pixel Sα21, "P21α" represents the first gradation data of the pixel P21, "P22α" represents the first gradation data of the pixel P22, "P31α" represents the first gradation data of the pixel P31, and "P32α" represents the first gradation data of the pixel P32.

$$S32\alpha = [K61, K62, K63, K64]\begin{bmatrix} P32\alpha \\ P33\alpha \\ P42\alpha \\ P43\alpha \end{bmatrix} \tag{18}$$

In Expression (18), "S32α" represents the third sub gradation data of the first sub pixel Sα32, "P32α" represents the first gradation data of the pixel P32, "P33α" represents the first gradation data of the pixel P33, "P42α" represents the first gradation data of the pixel P42, and "P43α" represents the first gradation data of the pixel P43.

Then, the drive circuit 11 generates sub pixel signals based on the first sub pixel data and drives the first sub pixels Sα as described above. The drive circuit 11 also generates sub pixel signals based on the second sub pixel data and drives the second sub pixels Sβ, as described above. The drive circuit 11 also generates sub pixel signals based on the third sub pixel data and drives the third sub pixels Sγ as described above.

In this manner, the drive circuit 11 drives the first sub pixels Sα, the second sub pixels Sβ, and the third sub pixels Sγ based on a plurality of pieces of the gradation data of the plurality of pixels P. In addition, the drive circuit 11 allocates the gradation data of one pixel P in the plurality of pixels P to the gradation data of another pixel P adjacent to the one pixel P and drives the first sub pixel Sα, the second sub pixel Sβ, and the third sub pixel Sγ included in the other pixel P based on the gradation data of the other pixel P. Occurrence of what is called jaggy is reduced in an image displayed by sub pixel signals generated by executing the above-described rendering processing, and thus display quality can be improved.

As listed in Table 4, the sum of a plurality of coefficients that multiply one piece of the first gradation data used to generate each of a plurality of pieces of the first sub gradation data is different from 1. For example, in FIG. 8, the sum of the coefficients K14, K64, K53, and K41 related to the first virtual lines α14, α64, α53, and α41 in one pixel CP3*a* on the positive Y side in the pair CP3 of pixels in a group GP4 of pixels is 14/16 as listed in Table 4 and different from 1.

TABLE 4

| CP3 CP3a | | CP1 CP1a | | CP2 CP2a | |
|---|---|---|---|---|---|
| K24 | 3/16 | K64 | 2/16 | K54 | 3/16 |
| K63 | 3/16 | K53 | 2/16 | K23 | 8/16 |
| K32 | 5/16 | K14 | 8/16 | K42 | 3/16 |
| K13 | 3/16 | K41 | 5/16 | K31 | 3/16 |
| Sum | 14/16 | Sum | 17/16 | Sum | 17/16 |
| CP3b | | CP1b | | CP2b | |
| K34 | 5/16 | K62 | 3/16 | K44 | 3/16 |
| K61 | 8/16 | K43 | 5/16 | K33 | 3/16 |
| K22 | 2/16 | K12 | 3/16 | K52 | 8/16 |
| K11 | 2/16 | K51 | 3/16 | K21 | 3/16 |
| Sum | 17/16 | Sum | 14/16 | Sum | 17/16 |

In Table 4, "CP3*b*" represents one pixel on the negative Y side in the pair CP3 of pixels in the group GP4 of pixels illustrated in FIG. 8. "CP1*a*" and "CP1*b*" represent one pixel on the positive Y side and the other pixel on the negative Y side in the pair CP1 of pixels in the group GP1 of pixels illustrated in FIG. 8. "CP2*a*" and "CP2*b*" represent one pixel on the positive Y side and the other pixel on the negative Y side in the pair CP3 of pixels in the group GP1 of pixels illustrated in FIG. 8.

Similarly to the above-described contents listed in Table 4, the sum of a plurality of coefficients that multiply one piece of the second gradation data used to generate each of a plurality of pieces of the second sub gradation data is different from 1. The sum of a plurality of coefficients that multiply one piece of the third gradation data used to generate each of a plurality of pieces of the third sub gradation data is different from 1.

First Modification of First Embodiment

The following mainly describes any difference of the display device 1 according to a first modification of the first embodiment from the above-described first embodiment.

In the first modification of the first embodiment, the values of coefficients for the pair CP1 of pixels are different from the values of the coefficients in the above-described first embodiment. Specifically, as listed in Table 5, the values of the coefficients K11, K14, K22, K23, K31, K32, K33, K42, K43, K44, K52, K53, K61, and K64 are different from the values of the coefficients in the above-described first embodiment.

TABLE 5

| CP1 | | | | | |
|---|---|---|---|---|---|
| Virtual line | Coefficient | | Virtual line | Coefficient | |
| α11 | K11 | 1/16 | β21 | K21 | 3/16 |
| α12 | K12 | 3/16 | β22 | K22 | 1/16 |
| α13 | K13 | 3/16 | β23 | K23 | 9/16 |
| α14 | K14 | 9/16 | β24 | K24 | 3/16 |
| | Sum | 1 | | Sum | 1 |
| γ31 | K31 | 2/16 | α41 | K41 | 5/16 |
| γ32 | K32 | 7/16 | α42 | K42 | 2/16 |
| γ33 | K33 | 2/16 | α43 | K43 | 7/16 |
| γ34 | K34 | 5/16 | α44 | K44 | 2/16 |
| | Sum | 1 | | Sum | 1 |
| β51 | K51 | 3/16 | γ61 | K61 | 9/16 |
| β52 | K52 | 9/16 | γ62 | K62 | 3/16 |
| β53 | K53 | 1/16 | γ63 | K63 | 3/16 |
| β54 | K54 | 3/16 | γ64 | K64 | 1/16 |
| | Sum | 1 | | Sum | 1 |

When the values of the coefficients are determined as in Table 5, the values of coefficients related to two virtual lines having a point-symmetric relation with respect to the point H as a fixed point among the plurality of virtual lines constituting the virtual figure illustrated in FIG. 9 are equal to one another. The values of coefficients related to two virtual lines having a line-symmetric relation with respect to the two straight lines L1 and L2 serving as axes of symmetry among the plurality of virtual lines constituting the virtual figure illustrated in FIG. 9 may be equal to one another or different from one another.

As listed in Table 6, the values of a plurality of coefficients that multiply one piece of the first gradation data used to generate each of a plurality of pieces of the first sub gradation data are determined so that the sum of the coefficients is 1. Thus, in rendering processing, the gradation data of the plurality of pixels P can be appropriately distributed to a plurality of pieces of the first sub gradation data. Similarly to the contents of Table 6, the sum of a plurality of coefficients that multiply one piece of the second gradation data used to generate each of a plurality of pieces of the second sub gradation data is 1. The sum of a plurality of coefficients that multiply one piece of the third gradation data used to generate each of a plurality of pieces of the third sub gradation data is 1.

TABLE 6

| CP3<br>CP3a | | CP1<br>CP1a | | CP2<br>CP2a | |
|---|---|---|---|---|---|
| K24 | 3/16 | K64 | 1/16 | K54 | 3/16 |
| K63 | 3/16 | K53 | 1/16 | K23 | 9/16 |
| K32 | 7/16 | K14 | 9/16 | K42 | 2/16 |
| K13 | 3/16 | K41 | 5/16 | K31 | 2/16 |
| Sum | 1 | Sum | 1 | Sum | 1 |
| CP3b | | CP1b | | CP2b | |
| K34 | 5/16 | K62 | 3/16 | K44 | 2/16 |
| K61 | 9/16 | K43 | 7/16 | K33 | 2/16 |
| K22 | 1/16 | K12 | 3/16 | K52 | 9/16 |
| K11 | 1/16 | K51 | 3/16 | K21 | 3/16 |
| Sum | 1 | Sum | 1 | Sum | 1 |

Similarly to the pair CP1 of pixels of the first modification, the pairs CP2 and CP3 of pixels in the first modification have different coefficient values from those of the pairs CP2 and CP3 of pixels in the above-described first embodiment.

Second Modification of First Embodiment

The following mainly describes any difference of the display device 1 according to a second modification of the first embodiment from the above-described first embodiment.

In the second modification of the first embodiment, the values of coefficients for the pair CP1 of pixels are different from the values of the coefficients in the above-described first embodiment. Specifically, as listed in Table 7, the values of the coefficients K13, K14, K23, K24, K51, K52, K61, and K62 are different from the values of the coefficients in the above-described first embodiment.

TABLE 7

| CP1 | | | | | |
|---|---|---|---|---|---|
| Virtual line | Coefficient | | Virtual line | Coefficient | |
| α11 | K11 | 2/16 | β21 | K21 | 3/16 |
| α12 | K12 | 3/16 | β22 | K22 | 2/16 |
| α13 | K13 | 4/16 | β23 | K23 | 7/16 |
| α14 | K14 | 7/16 | β24 | K24 | 4/16 |
| | Sum | 1 | | Sum | 1 |
| γ31 | K31 | 3/16 | α41 | K41 | 5/16 |
| γ32 | K32 | 5/16 | α42 | K42 | 3/16 |
| γ33 | K33 | 3/16 | α43 | K43 | 5/16 |
| γ34 | K34 | 5/16 | α44 | K44 | 3/16 |
| | Sum | 1 | | Sum | 1 |
| β51 | K51 | 4/16 | γ61 | K61 | 7/16 |
| β52 | K52 | 7/16 | γ62 | K62 | 4/16 |
| β53 | K53 | 2/16 | γ63 | K63 | 3/16 |
| β54 | K54 | 3/16 | γ64 | K64 | 2/16 |
| | Sum | 1 | | Sum | 1 |

When the values of the coefficients are determined as in Table 7, the values of coefficients related to two virtual lines having a point-symmetric relation with respect to at the point H as a fixed point among the plurality of virtual lines constituting the virtual figure illustrated in FIG. 9 are equal to one another. The values of coefficients related to two virtual lines having a line-symmetric relation with respect to the two straight lines L1 and L2 serving as axes of symmetry among the plurality of virtual lines constituting the virtual figure illustrated in FIG. 9 are equal to one another.

As listed in Table 8, the values of a plurality of coefficients that multiply one piece of the first gradation data used to generate each of a plurality of pieces of the first sub gradation data are determined so that the sum of the coefficients is 1. Thus, in rendering processing, the gradation data of the plurality of pixels P can be appropriately distributed to a plurality of pieces of the first sub gradation data.

TABLE 8

| CP3 CP3a | | CP1 CP1a | | CP2 CP2a | |
|---|---|---|---|---|---|
| K24 | 4/16 | K64 | 2/16 | K54 | 3/16 |
| K63 | 3/16 | K53 | 2/16 | K23 | 7/16 |
| K32 | 5/16 | K14 | 7/16 | K42 | 3/16 |
| K13 | 4/16 | K41 | 5/16 | K31 | 3/16 |
| Sum | 1 | Sum | 1 | Sum | 1 |
| **CP3b** | | **CP1b** | | **CP2b** | |
| K34 | 5/16 | K62 | 4/16 | K44 | 3/16 |
| K61 | 7/16 | K43 | 5/16 | K33 | 3/16 |
| K22 | 2/16 | K12 | 3/16 | K52 | 7/16 |
| K11 | 2/16 | K51 | 4/16 | K21 | 3/16 |
| Sum | 1 | Sum | 1 | Sum | 1 |

Similarly to the pair CP1 of pixels in the second modification, the pairs CP2 and CP3 of pixels in the second modification have different coefficient values from those of the pairs CP2 and CP3 of pixels in the above-described first embodiment.

Third Modification of First Embodiment

The following mainly describes any difference of the display device 1 according to a third modification of the first embodiment from the above-described first embodiment.

In the third modification of the first embodiment, the values of coefficients for the pair CP1 of pixels are different from the values of the coefficients in the above-described first embodiment. Specifically, as listed in Table 9, the values of the coefficients K11, K12, K13, K21, K22, K24, K32, K34, K41, K43, K51, K53, K54, K62, K63, and K64 are different from the values of the coefficients in the above-described first embodiment.

TABLE 9

| CP1 | | | | | |
|---|---|---|---|---|---|
| Virtual line | Coefficient | | Virtual line | Coefficient | |
| α11 | K11 | 1/16 | β21 | K21 | 2/16 |
| α12 | K12 | 2/16 | β22 | K22 | 1/16 |
| α13 | K13 | 4/16 | β23 | K23 | 8/16 |
| α14 | K14 | 8/16 | β24 | K24 | 4/16 |
| | Sum | 15/16 | | Sum | 15/16 |
| γ31 | K31 | 3/16 | α41 | K41 | 6/16 |
| γ32 | K32 | 6/16 | α42 | K42 | 3/16 |
| γ33 | K33 | 3/16 | α43 | K43 | 6/16 |
| γ34 | K34 | 6/16 | α44 | K44 | 3/16 |
| | Sum | 18/16 | | Sum | 18/16 |

TABLE 9-continued

| CP1 | | | | | |
|---|---|---|---|---|---|
| Virtual line | Coefficient | | Virtual line | Coefficient | |
| β51 | K51 | 4/16 | γ61 | K61 | 8/16 |
| β52 | K52 | 8/16 | γ62 | K62 | 4/16 |
| β53 | K53 | 1/16 | γ63 | K63 | 2/16 |
| β54 | K54 | 2/16 | γ64 | K64 | 1/16 |
| | Sum | 15/16 | | Sum | 15/16 |

When the values of the coefficients are determined as in Table 9, the values of coefficients related to two virtual lines having a point-symmetric relation with respect to the point H as a fixed point among the plurality of virtual lines constituting the virtual figure illustrated in FIG. 9 are equal to one another. The values of coefficients related to two virtual lines having a line-symmetric relation with respect to two straight lines serving as axes of symmetry among the plurality of virtual lines constituting the virtual figure illustrated in FIG. 9 are equal to one another.

However, the sum of a plurality of coefficients that respectively multiply a plurality of pieces of the first gradation data used to generate one piece of the first sub gradation data is different from 1. For example, in Table 9, the sum of the coefficients K11, K12, K13, and K14 is $^{15}/_{16}$.

In Table 9, the sum of the coefficients K11, K12, K13, and K14 is $^{18}/_{16}$. Thus, when the value of the first sub gradation data is larger than a predetermined data value, the value of the first sub gradation data is set to the predetermined data value. The predetermined data value is a maximum value of the first sub gradation data, which is determined in advance and stored in the storage region of the display device 1, and is, for example, 255. In this case, the value of the first sub gradation data may be set to a value smaller than the predetermined data value.

As listed in Table 10, the values of a plurality of coefficients that multiply one piece of the first gradation data used to generate each of a plurality of pieces of the first sub gradation data are determined so that the sum of the coefficients is 1. Thus, in rendering processing, the gradation data of the plurality of pixels P can be appropriately distributed to a plurality of pieces of the first sub gradation data.

TABLE 10

| CP3 CP3a | | CP1 CP1a | | CP2 CP2a | |
|---|---|---|---|---|---|
| K24 | 4/16 | K64 | 1/16 | K54 | 2/16 |
| K63 | 2/16 | K53 | 1/16 | K23 | 8/16 |
| K32 | 6/16 | K14 | 8/16 | K42 | 3/16 |
| K13 | 4/16 | K41 | 6/16 | K31 | 3/16 |
| Sum | 1 | Sum | 1 | Sum | 1 |
| **CP3b** | | **CP1b** | | **CP2b** | |
| K34 | 6/16 | K62 | 4/16 | K44 | 3/16 |
| K61 | 8/16 | K43 | 6/16 | K33 | 3/16 |
| K22 | 1/16 | K12 | 2/16 | K52 | 8/16 |
| K11 | 1/16 | K51 | 4/16 | K21 | 2/16 |
| Sum | 1 | Sum | 1 | Sum | 1 |

Similarly to the pair CP1 of pixels in the third modification, the pairs CP2 and CP3 of pixels in the third modification have different coefficient values from those of the pairs CP2 and CP3 of pixels in the above-described first embodiment.

Second Embodiment

The following mainly describes any difference of the display device 1 according to a second embodiment from the above-described first embodiment. In the display device 1 according to the second embodiment, the array of a plurality of sub pixels S in the display region DA is different from that in the display device 1 according to the above-described first embodiment.

Figure 11:
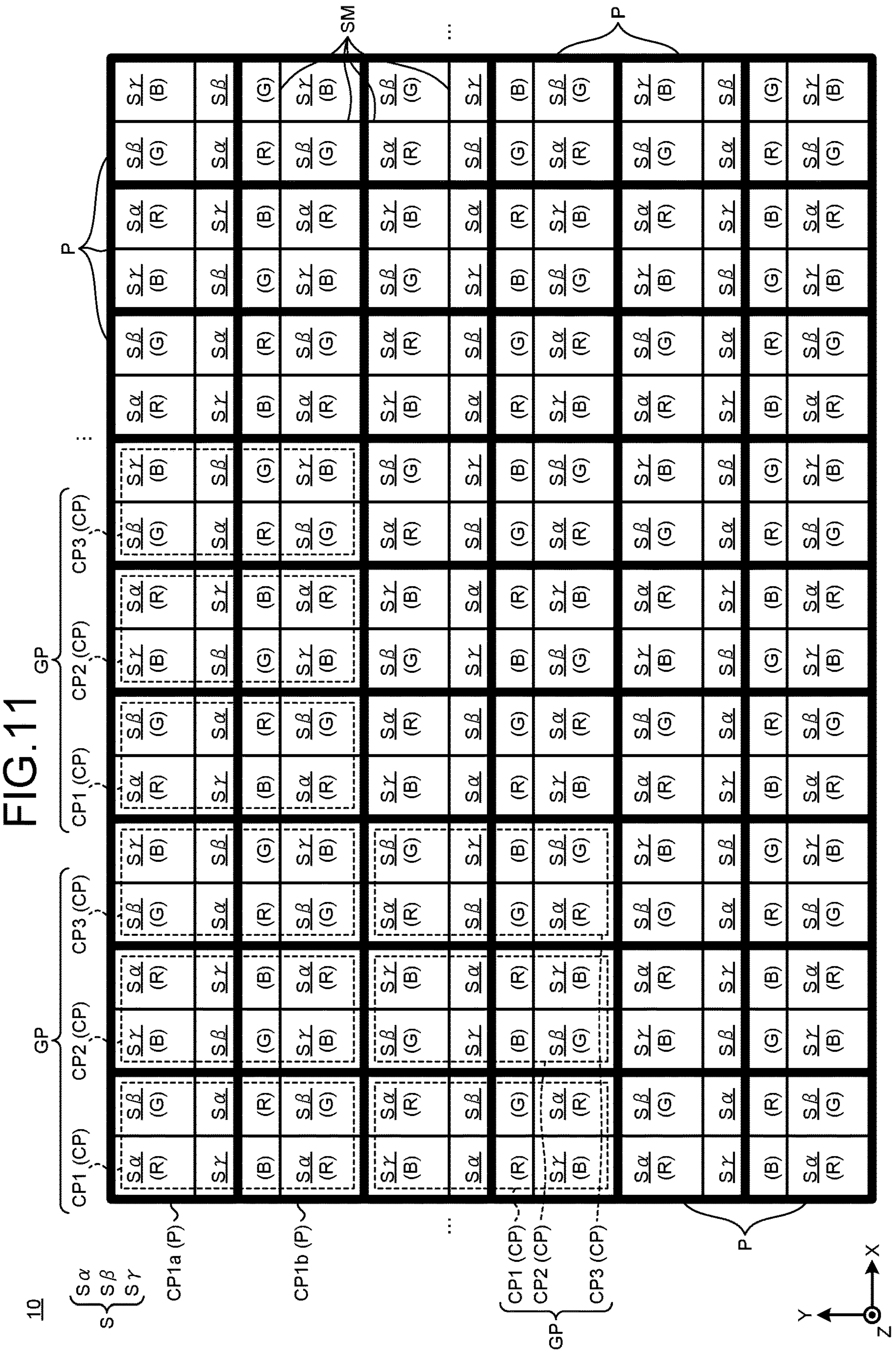
FIG. 11 is a diagram illustrating a plan view of the display panel in a display device according to a second embodiment.

FIG. 11 is a diagram illustrating a plan view of the display panel 10 in the display device 1 according to the second embodiment. The plurality of sub pixels S in FIG. 11 illustrated with the color filters CF and the light-shielding films SM. The plurality of first sub pixels Sα, the plurality of second sub pixels Sβ, and the plurality of third sub pixels Sγ are disposed in a matrix of a row-column configuration in the X and Y directions in a plan view.

The array of sub pixels S illustrated in FIG. 11 is referred to as a Delta2 array. Specifically, in the Delta2 array, the first, second, and third sub pixels Sα, Sβ, and Sγ are repeatedly disposed in the X direction in the order as listed. In addition, a first column, a second column, and a third column are repeatedly disposed in the X direction in the order as listed. In the first column, the first and third sub pixels Sα and Sγ are alternately arranged in the Y direction. In the second column, the second and first sub pixels Sβ, and Sα are alternately arranged in the Y direction. In the third column, the third and second sub pixels Sγ and Sβ, are alternately arranged in the Y direction.

In the second embodiment, each pair CP of pixels is composed of two pixels P adjacent to each other in the Y direction and is composed of six sub pixels as in the above-described first embodiment. However, in the second embodiment, since the array of a plurality of sub pixels S is different from that in the above-described first embodiment, the kinds of six sub pixels S included in each pair CP of pixels are different from those in the above-described first embodiment.

Among three pairs CP1, CP2, and CP3 of pixels included in a group GP of pixels illustrated in FIG. 11, the pair CP1 of pixels is composed of three first sub pixels Sα, two second sub pixels Sβ, and one third sub pixel Sγ.

Specifically, in the pair CP1 of pixels, a first sub pixel Sα (first first sub pixel Sα) positioned on the first row and the first column among the three first sub pixels Sα and one second sub pixel Sβ, positioned on the first row and the second column of the two second sub pixels 513, are included in one pixel CP1*a* positioned on the positive Y side in the pair CP1 of pixels.

In the pair CP1 of pixels, a first sub pixel Sα (second first sub pixel Sα) positioned on the third row and the first column among the three first sub pixels Sα and the other second sub pixel Sβ, positioned on the third row and the second column of the two second sub pixels 513, are included in the other pixel CP1*b* positioned on the negative Y side in the pair CP1 of pixels.

In the pair CP1 of pixels, a first sub pixel Sα (third first sub pixel Sα) positioned on the second row and the second column among the three first sub pixels Sα and one third sub pixel Sγ positioned on the second row and the first column, are disposed across and included in both pixels CP1*a* and CP1*b* in the pair CP1 of pixels.

In the pair CP2 of pixels adjacent to the pair CP1 of pixels on the positive X side of the pair CP1 of pixels, the third sub pixel Sγ are disposed in place of the first sub pixels Sα of the pair CP1 of pixels, the first sub pixel Sα are disposed in place of the second sub pixel Sβ, of the pair CP1 of pixels, and the second sub pixel Sβ, are disposed in place of the third sub pixel Sγ of the pair CP1 of pixels. That is, the pair CP2 of pixels is composed of three third sub pixels Sγ, two first sub pixels Sα, and one second sub pixel Sβ.

In the pair CP3 of pixels adjacent to the pair CP2 of pixels on the positive X side of the pair CP2 of pixels, the second sub pixel Sβ, are disposed in place of the first sub pixels Sα of the pair CP1 of pixels, the third sub pixel Sγ are disposed in place of the second sub pixel Sβ, of the pair CP1 of pixels, and the first sub pixel Sα are disposed in place of the third sub pixel Sγ of the pair CP1 of pixels. That is, the pair CP3 of pixels is composed of three second sub pixels Sβ, two third sub pixels Sγ, and one first sub pixel Sα.

Figure 12:
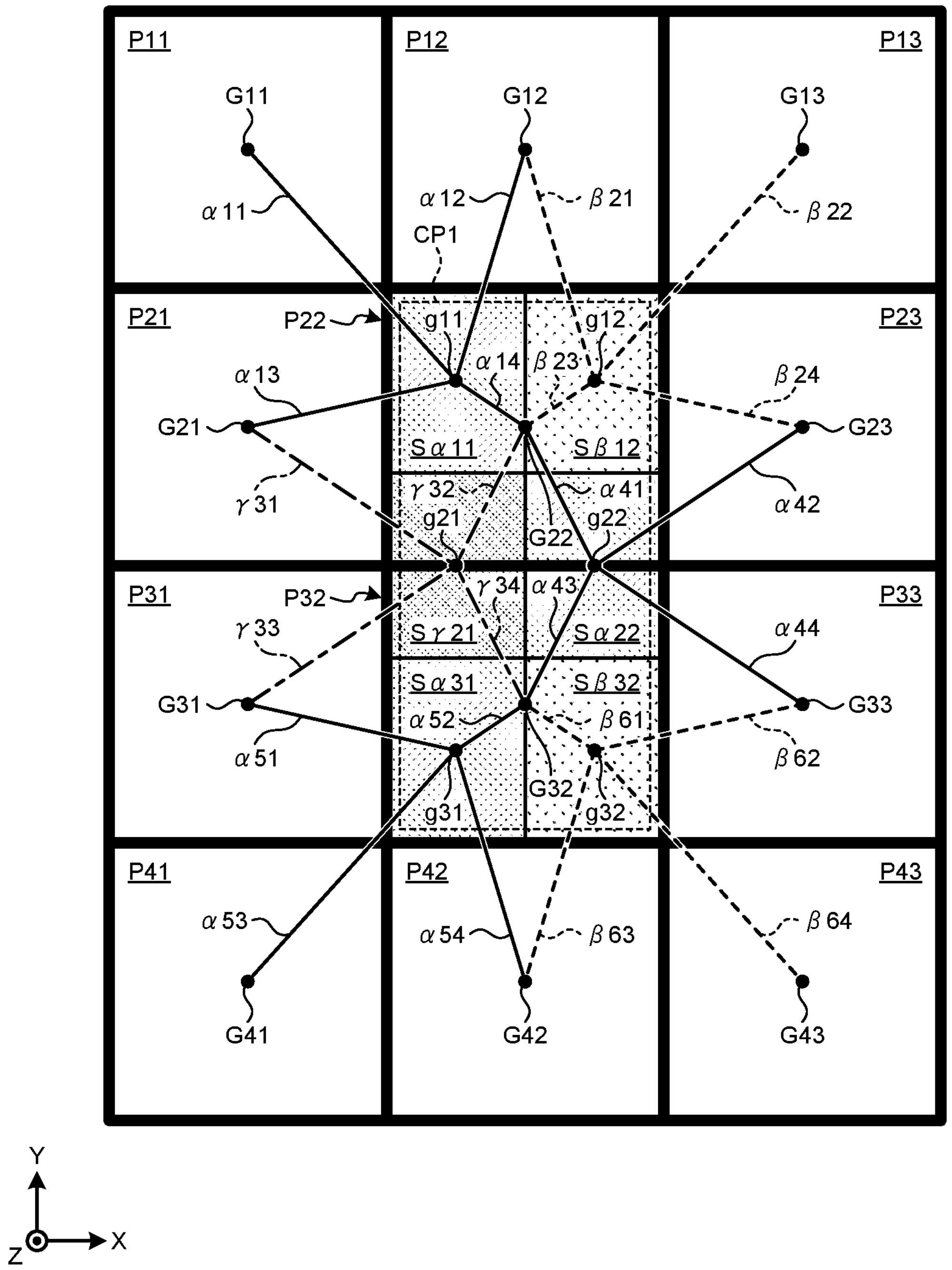
FIG. 12 is a diagram illustrating the relation between pixels and sub pixels in rendering processing executed for a pair of pixels in the second embodiment.

FIG. 12 is a diagram illustrating the relation between pixels P and sub pixels S in rendering processing executed for the pair CP1 of pixels in the second embodiment. As described above, the array of a plurality of sub pixels S in the pair CP1 of pixels illustrated in FIG. 12 is different from that of the pair CP1 of pixels illustrated in FIG. 5 in the above-described first embodiment.

In the second embodiment as well, the same rendering processing as in the above-described first embodiment is performed. In the second embodiment, the array of a plurality of sub pixels S is different from the array in the above-described first embodiment, but the relative positional relation between sub pixels S and pixels P is the same. Thus, a virtual figure formed by first virtual lines, second virtual lines, and third virtual lines in the pair CP1 of pixels illustrated in FIG. 12 has the same shape as the virtual figure of the above-described first embodiment illustrated in FIG. 9.

However, since the array of a plurality of sub pixels S in the second embodiment is different from the array in the above-described first embodiment, numbers added to the reference signs of virtual lines at the same position among the virtual lines constituting the virtual figure in the second embodiment and the virtual lines constituting the virtual figure in the above-described first embodiment are equal to each other, but the kinds of virtual lines at the same position may be equal to one another or different from one another.

For example, in the pair CP1 of pixels according to the second embodiment, coefficients are determined as in Table 11. In Table 11, the values of coefficients related to two virtual lines having a line-symmetric relation and two virtual lines having a point-symmetric relation among a plurality of virtual lines are equal to each other. The sum of a plurality of coefficients that multiply a plurality of pieces of the first gradation data used to generate one piece of the first sub gradation data is 1.

TABLE 11

| CP1 | | | | | |
|---|---|---|---|---|---|
| Virtual line | Coefficient | | Virtual line | Coefficient | |
| α11 | K11 | 2/16 | β21 | K21 | 2/16 |
| α12 | K12 | 2/16 | β22 | K22 | 2/16 |
| α13 | K13 | 4/16 | β23 | K23 | 8/16 |
| α14 | K14 | 8/16 | β24 | K24 | 4/16 |
| | Sum | 1 | | Sum | 1 |

TABLE 11-continued

| CP1 | | | | | |
|---|---|---|---|---|---|
| Virtual line | Coefficient | | Virtual line | Coefficient | |
| γ31 | K31 | 2/16 | α41 | K41 | 6/16 |
| γ32 | K32 | 6/16 | α42 | K42 | 2/16 |
| γ33 | K33 | 2/16 | α43 | K43 | 6/16 |
| γ34 | K34 | 6/16 | α44 | K44 | 2/16 |
| | Sum | 1 | | Sum | 1 |
| α51 | K51 | 4/16 | β61 | K61 | 8/16 |
| α52 | K52 | 8/16 | β62 | K62 | 4/16 |
| α53 | K53 | 2/16 | β63 | K63 | 2/16 |
| α54 | K54 | 2/16 | β64 | K64 | 2/16 |
| | Sum | 1 | | Sum | 1 |

Figure 13:
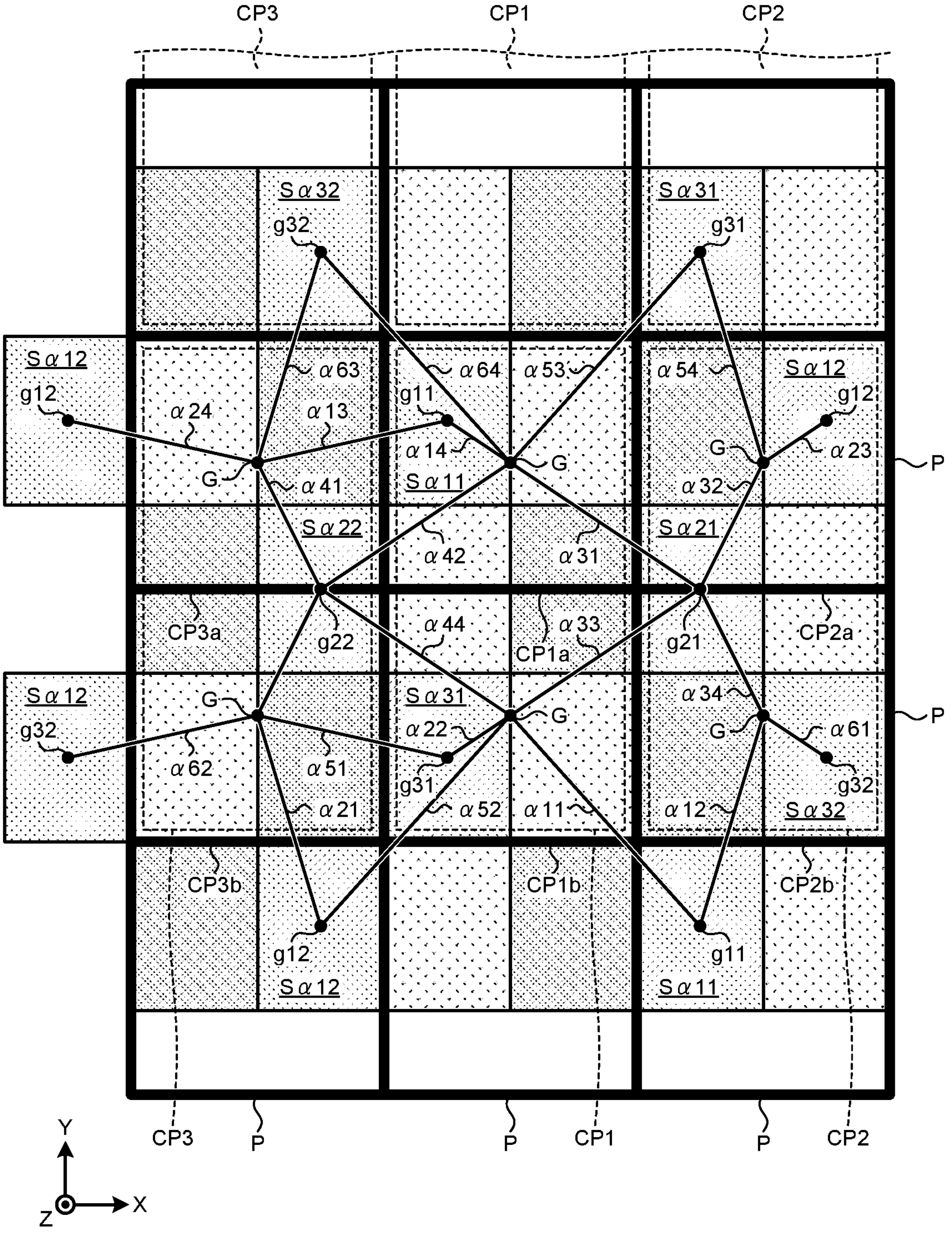
FIG. 13 is a diagram illustrating the relation between a pixel and a first sub pixel in rendering processing according to the second embodiment.

FIG. 13 is a diagram illustrating the relation between pixels P and first sub pixels Sα in rendering processing according to the second embodiment. Since the array of a plurality of sub pixels S in the second embodiment is different from the array in the above-described first embodiment, the relation according to the second embodiment illustrated in FIG. 13 is different from the relation according to the above-described first embodiment illustrated in FIG. 8. For example, the first gradation data of a pixel P positioned on the negative Y side in the pair CP1 of pixels is used to generate first sub pixel data of five first sub pixels Sα.

As listed in Table 12, the sum of a plurality of coefficients that multiply one piece of the first gradation data used to generate each of a plurality of pieces of the first sub gradation data is 1.

TABLE 12

| CP3 CP3a | | CP1 CP1a | | CP2 CP2a | |
|---|---|---|---|---|---|
| K63 | 2/16 | K64 | 2/16 | K23 | 8/16 |
| K24 | 4/16 | K53 | 2/16 | K32 | 6/16 |
| K13 | 4/16 | K14 | 8/16 | K54 | 2/16 |
| K41 | 6/16 | K42 | 2/16 | Sum | 1 |
| Sum | 1 | K31 | 2/16 | | |
| | | Sum | 1 | | |
| **CP3b** | | **CP1b** | | **CP2b** | |
| K21 | 2/16 | K11 | 2/16 | K12 | 2/16 |
| K43 | 6/16 | K22 | 2/16 | K34 | 6/16 |
| K51 | 4/16 | K33 | 2/16 | K61 | 8/16 |
| K62 | 4/16 | K52 | 8/16 | Sum | 1 |
| Sum | 1 | K44 | 2/16 | | |
| | | Sum | 1 | | |

In the pair CP1 of pixels of the second embodiment, first sub pixel data of the first sub pixel Sα11 can be expressed by a matrix equation of Expression (19), and first sub pixel data of the first sub pixel Sα22 can be expressed by a matrix equation of Expression (20). In addition, first sub pixel data of the first sub pixel Sα31 can be expressed by a matrix equation of Expression (21).

$$S11\alpha = [K11, K12, K13, K14]\begin{bmatrix} P11\alpha \\ P12\alpha \\ P21\alpha \\ P22\alpha \end{bmatrix} \tag{19}$$

$$S22\alpha = [K41, K42, K43, K44]\begin{bmatrix} P22\alpha \\ P23\alpha \\ P32\alpha \\ P33\alpha \end{bmatrix} \tag{20}$$

$$S31\alpha = [K51, K52, K53, K54]\begin{bmatrix} P31\alpha \\ P32\alpha \\ P41\alpha \\ P42\alpha \end{bmatrix} \tag{21}$$

In addition, in the pair CP1 of pixels of the second embodiment, second sub pixel data of the second sub pixel Sβ12 can be expressed by a matrix equation of Expression (22), and second sub pixel data of the second sub pixel Sβ32 can be expressed by a matrix equation of Expression (23).

$$S12\beta = [K21, K22, K23, K24]\begin{bmatrix} P12\beta \\ P13\beta \\ P22\beta \\ P23\beta \end{bmatrix} \tag{22}$$

$$S32\beta = [K61, K62, K63, K64]\begin{bmatrix} P32\beta \\ P33\beta \\ P42\beta \\ P43\beta \end{bmatrix} \tag{23}$$

Similarly, in the pair CP1 of pixels of the second embodiment, third sub pixel data of the third sub pixel Sγ21 can be expressed by a matrix equation of Expression (24).

$$S21\gamma = [K31, K32, K33, K34]\begin{bmatrix} P21\gamma \\ P22\gamma \\ P31\gamma \\ P32\gamma \end{bmatrix} \tag{24}$$

First sub pixel data, second sub pixel data, and third sub pixel data can be generated for the other pairs CP2 and CP3 of pixels in the group GP of pixels by changing Table 11 and Expressions (19), (20), (21), (22), (23), and (24) in accordance with interchange of the first sub pixels Sα, the second sub pixels Sβ, and the third sub pixels Sγ as compared to the above-described pair CP of pixels.

First Modification of Second Embodiment

The following mainly describes any difference of the display device 1 according to a first modification of the second embodiment from the above-described second embodiment.

In the first modification of the second embodiment, the values of coefficients for the pair CP1 of pixels are different from the values of the coefficients in the above-described first embodiment. Specifically, as listed in Table 13, the values of the coefficients K12, K14, K21, K23, K33, K34, K41, K42, K52, K54, K61, and K63 are different from the values of the coefficients in the above-described first embodiment.

TABLE 13

| CP1 | | | | | |
|---|---|---|---|---|---|
| Virtual line | Coefficient | | Virtual line | Coefficient | |
| α11 | K11 | 2/16 | β21 | K21 | 3/16 |
| α12 | K12 | 3/16 | β22 | K22 | 2/16 |
| α13 | K13 | 4/16 | β23 | K23 | 7/16 |
| α14 | K14 | 7/16 | β24 | K24 | 4/16 |
| | Sum | 1 | | Sum | 1 |
| γ31 | K31 | 2/16 | α41 | K41 | 5/16 |
| γ32 | K32 | 6/16 | α42 | K42 | 3/16 |
| γ33 | K33 | 3/16 | α43 | K43 | 6/16 |
| γ34 | K34 | 5/16 | α44 | K44 | 2/16 |
| | Sum | 1 | | Sum | 1 |
| α51 | K51 | 4/16 | β61 | K61 | 7/16 |
| α52 | K52 | 7/16 | β62 | K62 | 4/16 |
| α53 | K53 | 2/16 | β63 | K63 | 3/16 |
| α54 | K54 | 3/16 | β64 | K64 | 2/16 |
| | Sum | 1 | | Sum | 1 |

When the values of the coefficients are determined as in Table 13, the values of coefficients related to two virtual lines having a point-symmetric relation with respect to the point H as a fixed point among the plurality of virtual lines constituting the virtual figure illustrated in FIG. 12 are equal to each other. The values of coefficients related to two virtual lines having a line-symmetric relation with respect to the two straight lines L1 and L2 serving as axes of symmetry among the plurality of virtual lines constituting the virtual figure illustrated in FIG. 12 may be equal to one another or different from one another.

As listed in Table 14, the sum of a plurality of coefficients that multiply one piece of the first gradation data used to generate each of a plurality of pieces of the first sub gradation data may be 1 or different from 1.

TABLE 14

| CP3 CP3a | | CP1 CP1a | | CP2 CP2a | |
|---|---|---|---|---|---|
| K63 | 3/16 | K64 | 2/16 | K23 | 7/16 |
| K24 | 4/16 | K53 | 2/16 | K32 | 6/16 |
| K13 | 4/16 | K14 | 7/16 | K54 | 3/16 |
| K41 | 5/16 | K42 | 3/16 | Sum | 1 |
| Sum | 1 | K31 | 2/16 | | |
| | | Sum | 1 | | |
| **CP3b** | | **CP1b** | | **CP2b** | |
| K21 | 3/16 | K11 | 2/16 | K12 | 2/16 |
| K43 | 6/16 | K22 | 2/16 | K34 | 5/16 |
| K51 | 4/16 | K33 | 3/16 | K61 | 7/16 |
| K62 | 4/16 | K52 | 7/16 | Sum | 14/16 |
| Sum | 17/16 | K44 | 2/16 | | |
| | | Sum | 1 | | |

Second Modification of Second Embodiment

The following mainly describes any difference of the display device 1 according to a second modification of the second embodiment from the above-described second embodiment. Disposition of two pixels P constituting each pair CP of pixels in the display device 1 according to the second embodiment is different from disposition in the above-described second embodiment.

Figure 14:
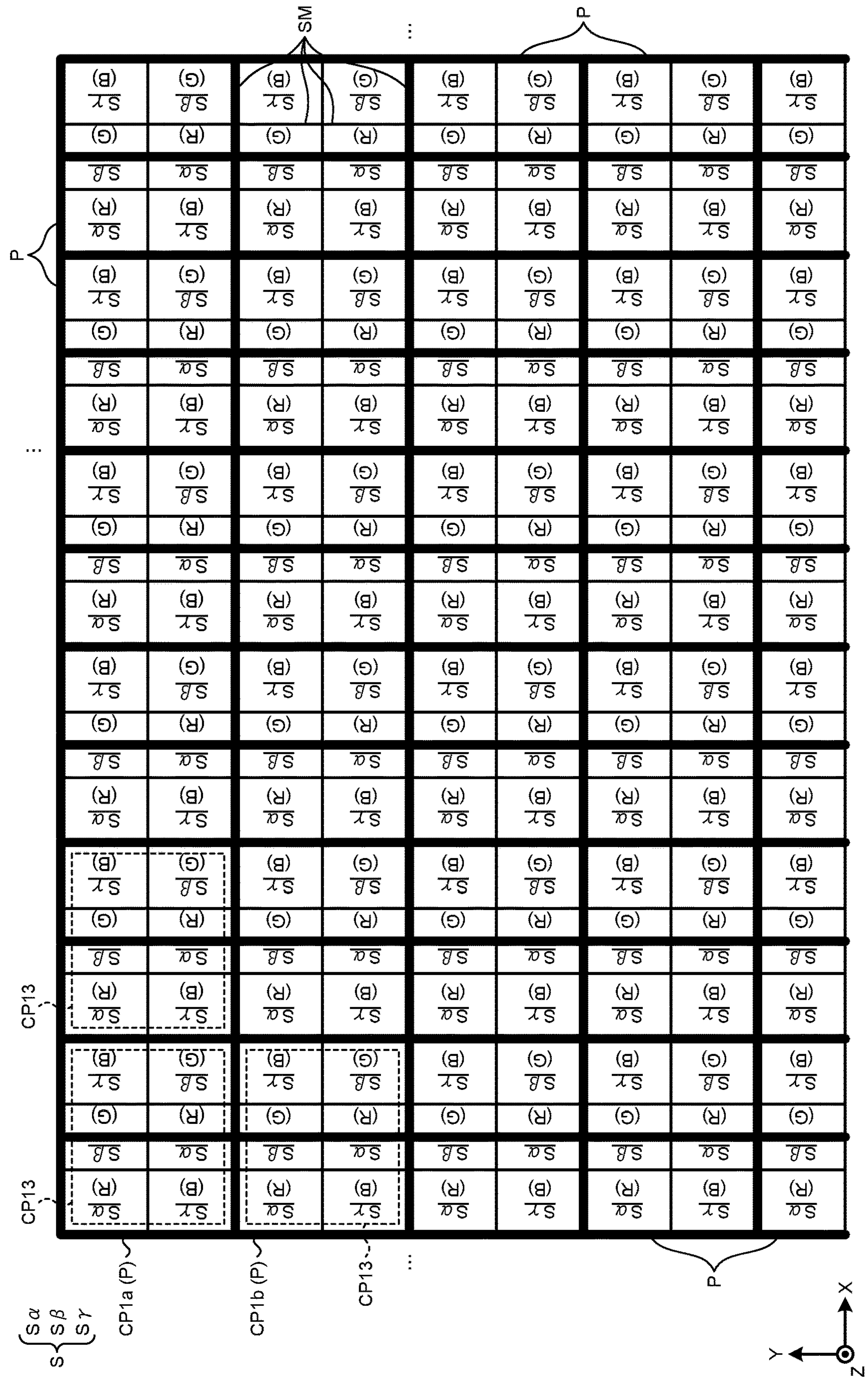
FIG. 14 is a diagram illustrating each pair of pixels according to a second modification of the second embodiment.

FIG. 14 is a diagram illustrating each pair of pixels P according to the second modification of the second embodiment. Each pair CP13 of pixels of the second modification is composed of two pixels P adjacent to each other in the X direction.

Each pair CP13 of pixels of the second modification is also composed of two first sub pixels Sα, two second sub pixels Sβ, and two third sub pixels Sγ. The configuration of the pair CP13 of pixels of the second modification is the same as a configuration obtained when the configuration of the pair CP3 of pixels of the above-described first embodiment is inverted with respect to the straight line L2 serving as an axis of symmetry and rotated by 90° about the point H in a plan view.

Specifically, one first sub pixel Sα positioned on the negative X side of the two first sub pixels Sα and one third sub pixel Sγ positioned on the negative X side of the two third sub pixels Sγ are included in one pixel P positioned on the negative X side in the pair CP13 of pixels.

One second sub pixel Sβ, positioned on the positive X side of the two second sub pixels Sβ, and the other third sub pixel Sγ positioned on the positive X side of the two third sub pixels Sγ are included in the other pixel P positioned on the positive X side in the pair CP13 of pixels.

The other second sub pixel Sβ, positioned on the negative X side of the two second sub pixels Sβ, and the other first sub pixel Sα positioned on the positive X side of the two first sub pixels Sα are disposed across and included in both pixels P in the pair CP13 of pixels.

Similarly to the above-described first embodiment, rendering processing is performed for each pair CP13 of pixels of the second modification. Specifically, the drive circuit 11 generates the first sub gradation data by using the first gradation data of pixels P adjacent to a first sub pixel Sα among the plurality of pixels P and the first gradation data of a pixel P including the first sub pixel Sα and drives the first sub pixel Sα based on the first sub gradation data.

The drive circuit 11 also generates the second sub gradation data by using the second gradation data of pixels P adjacent to a second sub pixel Sβ, among the plurality of pixels P and the second gradation data of a pixel P including the second sub pixel Sβ, and drives the second sub pixel Sβ, based on the second sub gradation data. The drive circuit 11 also generates the third sub gradation data by using the third gradation data of pixels P adjacent to a third sub pixel Sγ among the plurality of pixels P and the third gradation data of a pixel P including the third sub pixel Sγ and drives the third sub pixel Sγ based on the third sub gradation data.

Similarly to the above-described first embodiment, the drive circuit 11 generates the first sub gradation data, the second sub gradation data, and the third sub gradation data by using coefficients that weights the gradation data. Similarly to the above-described first embodiment, the values of the coefficients are determined in association with a plurality of virtual lines.

In the display region DA of the second modification, the pairs CP13 of pixels are arranged in a matrix of a row-column configuration in the X and Y directions. In other words, in the second modification, the number of kinds of pairs CP of pixels is 1 as a pair CP13 of pixels. Thus, the number of matrix equations indicating first sub pixel data, second sub pixel data, and third sub pixel data can be reduced to ⅓ as compared to a case in which the number of kinds of pairs CP of pixels is three as in the above-described first and second embodiments. Consequently, the storage region of the display device 1 can be further reduced.

Preferable embodiments of the present disclosure are described above, but the present disclosure is not limited to such embodiments. Contents disclosed in the embodiment are merely exemplary and may be modified in various kinds of manners without departing from the scope of the present invention. Any modification performed as appropriate without departing from the scope of the present invention naturally belongs to the technical scope of the present invention.

For example, the above-described display panel 10 may be a vertical field liquid crystal display in which a common electrode CE is disposed on the second substrate 14 to face a plurality of sub pixel electrodes PE. Alternatively, the display panel 10 may be a reflective liquid crystal display.

A plurality of sub pixels are arrayed in the X and Y directions orthogonal to each other, but may be arrayed along two straight lines intersecting each other and having an acute angle therebetween.

Each coefficient may be weighted with a value (for example, the value of gradation data) other than the distance between a pixel P and a sub pixel S. The drive circuit 11 may generate sub gradation data without using coefficients, in other words, by using unweighted gradation data.

In determination of a coefficient, the distance between a first sub pixel Sα and a pixel P is the distance between their area centroids, but may be the distance between any given points (for example, the center points of sides on the negative Y side).

It should be understood that the present disclosure provides any other effects achieved by aspects described above in the embodiments, such as effects that are clear from the description of the present specification or effects that could be thought of by the skilled person in the art as appropriate.

What is claimed is:

1. A display device comprising:

a plurality of first sub pixels, a plurality of second sub pixels, and a plurality of third sub pixels included in a plurality of pixels in a display region; and a drive circuit configured to drive the first sub pixels, the second sub pixels, and the third sub pixels based on a plurality of pieces of gradation data of each of the plurality of pixels, wherein each pair of pixels including two pixels adjacent to each other among the plurality of pixels includes two of the first sub pixels, two of the second sub pixels, two of the third sub pixels, and a boundary between the two pixels, one of the two of the first sub pixels and one of the two of the second sub pixels are disposed without crossing the boundary and included in one of the pair of pixels, the other of the two of the second sub pixels and one of the two of the third sub pixels are disposed without crossing the boundary and included in the other of the pair of pixels, the other of the two of the third sub pixels and the other of the two of the first sub pixels are disposed across the boundary and included in both of the pair of pixels, the drive circuit is configured to allocate the gradation data of one of the plurality of pixels to the gradation data of another pixel adjacent to the one pixel among the plurality of pixels and drive the first, second, and third sub pixels included in the other pixel based on the gradation data of the other pixel, the gradation data includes first gradation data, second gradation data, and third gradation data, and the drive circuit is configured to generate first sub gradation data by using the first gradation data of a pixel adjacent to one of the first sub pixels among the plurality of pixels and the first gradation data of a pixel including the first sub pixel and drive the first sub pixel based on the first sub gradation data, generate second sub gradation data by using the second gradation data of a pixel adjacent to one of the second sub pixels among the plurality of pixels and the second gradation data of a pixel including the second sub pixel and drive the second sub pixel based on the second sub gradation data, generate third sub gradation data by using the third gradation data of a pixel adjacent to one of the third sub pixels among the plurality of pixels and the third gradation data of a pixel including the third sub pixel and drive the third sub pixel based on the third sub gradation data, generate a virtual pixel adjacent to each of the plurality of pixels outside the display region, set the gradation data of the virtual pixel as the same data as the gradation data of the pixel adjacent to the virtual pixel, and use the first gradation data included in the gradation data of the virtual pixel when generating the first sub gradation data of a first sub pixel included in the corresponding pair of pixels positioned in the periphery of the display region.

2. The display device according to claim 1, wherein the drive circuit is configured to generate the first sub gradation data by using the first gradation data multiplied by a coefficient that weights the first gradation data, and the coefficient is smaller as the distance between the first sub pixel and the adjacent pixel in a plan view is longer.

3. The display device according to claim 2, wherein the plurality of coefficients are each expressed as a fraction having a predetermined value as a denominator, and the predetermined value is a binary number equal to or larger than 16.

4. The display device according to claim 1, wherein the drive circuit is configured to generate the first sub gradation data by using the first gradation data multiplied by a coefficient that weights the first gradation data, and the sum of a plurality of coefficients that respectively multiply the plurality of pieces of first gradation data used to generate one piece of the first sub gradation data is 1.

5. The display device according to claim 4, wherein the plurality of coefficients are each expressed as a fraction having a predetermined value as a denominator, and the predetermined value is a binary number equal to or larger than 16.

6. The display device according to claim 1, wherein the drive circuit is configured to generate the first sub gradation data by using the first gradation data multiplied by a coefficient that weights the first gradation data, the sum of a plurality of coefficients that respectively multiply the plurality of pieces of first gradation data used to generate one piece of the first sub gradation data is not 1, and when one piece of the first sub gradation data has a value larger than a predetermined data value, the first sub gradation data is set as the predetermined data value.

7. The display device according to claim 6, wherein the plurality of coefficients are each expressed as a fraction having a predetermined value as a denominator, and the predetermined value is a binary number equal to or larger than 16.

8. The display device according to claim 1, wherein the drive circuit is configured to generate the first sub gradation data by using the first gradation data multiplied by a coefficient that weights the first gradation data, and the sum of a plurality of coefficients that multiply one piece of the first gradation data used to generate a plurality of pieces of the first sub gradation data is 1.

9. The display device according to claim 8, wherein the plurality of coefficients are each expressed as a fraction having a predetermined value as a denominator, and the predetermined value is a binary number equal to or larger than 16.

10. The display device according to claim 1, wherein the first sub pixels, the second sub pixels, and the third sub pixels are disposed in a matrix of a row-column configuration in a first direction and a second direction intersecting the first direction, in a plan view, the first, second, and third sub pixels are repeatedly disposed in the first direction in the order as listed, and the first, third, and second sub pixels are repeatedly disposed in the second direction in the order as listed.

11. The display device according to claim 1, wherein the color of the first sub pixels is red, the color of the second sub pixels is green, and the color of the third sub pixels is blue.

12. The display device according to claim 1, wherein the boundary has a first portion which is surrounded by a first part of the other of the two of the third sub pixels and a second part of the other of the two of the third sub pixels, and the boundary has a second portion which is surrounded by a first part of the other of the two of the first sub pixels and a second part of the other of the two of the first sub pixels.

13. A display device comprising:

a plurality of first sub pixels, a plurality of second sub pixels, and a plurality of third sub pixels included in a plurality of pixels in a display region; and a drive circuit configured to drive the first sub pixels, the second sub pixels, and the third sub pixels based on a plurality of pieces of gradation data of each of the plurality of pixels, wherein each pair of pixels including two pixels adjacent to each other among the plurality of pixels includes two of the first sub pixels, two of the second sub pixels, two of the third sub pixels, and a boundary between the two pixels, one of the two of the first sub pixels and one of the two of the second sub pixels are disposed without crossing the boundary and included in one of the pair of pixels, the other of the two of the second sub pixels and one of the two of the third sub pixels are disposed without crossing the boundary and included in the other of the pair of pixels, the other of the two of the third sub pixels and the other of the two of the first sub pixels are disposed across the boundary and included in both of the pair of pixels, the drive circuit is configured to allocate the gradation data of one of the plurality of pixels to the gradation data of another pixel adjacent to the one pixel among the plurality of pixels and drive the first, second, and third sub pixels included in the other pixel based on the gradation data of the other pixel, the gradation data includes first gradation data, second gradation data, and third gradation data, the drive circuit is configured to generate first sub gradation data by using the first gradation data of a pixel adjacent to one of the first sub pixels among the plurality of pixels and the first gradation data of a pixel including the first sub pixel and drive the first sub pixel based on the first sub gradation data, generate second sub gradation data by using the second gradation data of a pixel adjacent to one of the second sub pixels among the plurality of pixels and the second gradation data of a pixel including the second sub pixel and drive the second sub pixel based on the second sub gradation data, generate third sub gradation data by using the third gradation data of a pixel adjacent to one of the third sub pixels among the plurality of pixels and the third gradation data of a pixel including the third sub pixel and drive the third sub pixel based on the third sub gradation data, generate the first sub gradation data by using the first gradation data multiplied by a coefficient that weights the first gradation data, generate the second sub gradation data by using the second gradation data multiplied by a coefficient that weights the second gradation data, and generate the third sub gradation data by using the third gradation data multiplied by a coefficient that weights the third gradation data, a virtual figure formed by a plurality of first virtual lines, a plurality of second virtual lines, and a plurality of third virtual lines has a line-symmetric shape with respect to a straight line serving as an axis of symmetry and passing through an area centroid of the pair of pixels in a plan view, the plurality of first virtual lines are straight lines connecting, in a plan view of each of the two first sub pixels included in the pair of pixels, the area centroid of the first sub pixel to one of the area centroid of the pixel including the first sub pixel and the area centroids of a plurality of the pixels adjacent to the first sub pixel, each first virtual line indicating the relation between the first sub gradation data and one of the plurality of pieces of first gradation data used to generate the first sub gradation data, the plurality of second virtual lines are straight lines connecting, in a plan view of each of the two second sub pixels each included in the pair of pixels, the area centroid of the second sub pixel to one of the area centroid of the pixel including the second sub pixel and the area centroids of a plurality of the pixels adjacent to the second sub pixel, each second virtual line indicating the relation between the second sub gradation data and one of the plurality of pieces of second gradation data used to generate the second sub gradation data, the plurality of third virtual lines are straight lines connecting, in a plan view of each of the two third sub pixels each included in the pair of pixels, the area centroid of the third sub pixel to one of the area centroid of the pixel including the third sub pixel and the area centroids of a plurality of the pixels adjacent to the third sub pixel, each third virtual line indicating the relation between the third sub gradation data and one of the plurality of pieces of third gradation data used to generate the third sub gradation data, the coefficients are associated with the first virtual lines, the second virtual lines, and the third virtual lines in accordance with the relation between the first sub gradation data and each of the plurality of pieces of first gradation data, the relation between the second sub gradation data and each of the plurality of pieces of second gradation data, and the relation between the third sub gradation data and each of the plurality of pieces of third gradation data, and two of the coefficients are equal to each other, the two coefficients being related to two straight lines having a line-symmetric relation among the plurality of first virtual lines, the plurality of second virtual lines, and the plurality of third virtual lines.

14. The display device according to claim 13, wherein the plurality of coefficients are each expressed as a fraction having a predetermined value as a denominator, and the predetermined value is a binary number equal to or larger than 16.

15. A display device comprising:

a plurality of first sub pixels, a plurality of second sub pixels, and a plurality of third sub pixels included in a plurality of pixels in a display region; and a drive circuit configured to drive the first sub pixels, the second sub pixels, and the third sub pixels based on a plurality of pieces of gradation data of each of the plurality of pixels, wherein each pair of pixels including two pixels adjacent to each other among the plurality of pixels includes two of the first sub pixels, two of the second sub pixels, two of the third sub pixels, and a boundary between the two pixels, one of the two of the first sub pixels and one of the two of the second sub pixels are disposed without crossing the boundary and included in one of the pair of pixels, the other of the two of the second sub pixels and one of the two of the third sub pixels are disposed without crossing the boundary and included in the other of the pair of pixels, the other of the two of the third sub pixels and the other of the two of the first sub pixels are disposed across the boundary and included in both of the pair of pixels, the drive circuit is configured to allocate the gradation data of one of the plurality of pixels to the gradation data of another pixel adjacent to the one pixel among the plurality of pixels and drive the first, second, and third sub pixels included in the other pixel based on the gradation data of the other pixel, the gradation data includes first gradation data, second gradation data, and third gradation data, the drive circuit is configured to generate first sub gradation data by using the first gradation data of a pixel adjacent to one of the first sub pixels among the plurality of pixels and the first gradation data of a pixel including the first sub pixel and drive the first sub pixel based on the first sub gradation data, generate second sub gradation data by using the second gradation data of a pixel adjacent to one of the second sub pixels among the plurality of pixels and the second gradation data of a pixel including the second sub pixel and drive the second sub pixel based on the second sub gradation data, generate third sub gradation data by using the third gradation data of a pixel adjacent to one of the third sub pixels among the plurality of pixels and the third gradation data of a pixel including the third sub pixel and drive the third sub pixel based on the third sub gradation data, generate the first sub gradation data by using the plurality of pieces of first gradation data multiplied by coefficients that weight the first gradation data, generate the second sub gradation data by using the plurality of pieces of second gradation data multiplied by coefficients that weight the second gradation data, and generate the third sub gradation data by using the plurality of pieces of third gradation data multiplied by coefficients that weight the third gradation data, a virtual figure formed by a plurality of first virtual lines, a plurality of second virtual lines, and a plurality of third virtual lines has a point-symmetric shape with respect to a fixed point at the area centroid of the pair of pixels in a plan view, the plurality of first virtual lines are straight lines connecting, in a plan view of each of the two first sub pixels included in the pair of pixels, the area centroid of the first sub pixel to one of the area centroid of the pixel including the first sub pixel and the area centroids of a plurality of the pixels adjacent to the first sub pixel, each first virtual line indicating the relation between the first sub gradation data and one of the plurality of pieces of first gradation data used to generate the first sub gradation data, the plurality of second virtual lines are straight lines connecting, in a plan view of each of the two second sub pixels each included in the pair of pixels, the area centroid of the second sub pixel to one of the area centroid of the pixel including the second sub pixel and the area centroids of a plurality of the pixels adjacent to the second sub pixel, each second virtual line indicating the relation between the second sub gradation data and one of the plurality of pieces of second gradation data used to generate the second sub gradation data, the plurality of third virtual lines are straight lines connecting in a plan view of each of the two third sub pixels each included in the pair of pixels, the area centroid of the third sub pixel to one of the area centroid of the pixel including the third sub pixel and the area centroids of a plurality of the pixels adjacent to the third sub pixel, each third virtual line indicating the relation between the third sub gradation data and one of the plurality of pieces of third gradation data used to generate the third sub gradation data, the plurality of coefficients are associated with the plurality of first virtual lines, the plurality of second virtual lines, and the plurality of third virtual lines in accordance with the relation between the first sub gradation data and each of the plurality of pieces of first gradation data, the relation between the second sub gradation data and each of the plurality of pieces of second gradation data, and the relation between the third sub gradation data and each of the plurality of pieces of third gradation data, and two of the coefficients are equal to each other, the two coefficients being related to two straight lines having a point-symmetric relation among the plurality of first virtual lines, the plurality of second virtual lines, and the plurality of third virtual lines.

16. The display device according to claim 15, wherein the plurality of coefficients are each expressed as a fraction having a predetermined value as a denominator, and the predetermined value is a binary number equal to or larger than 16.

* * * * *